US010521472B2

(12) United States Patent
Boic

(10) Patent No.: US 10,521,472 B2
(45) Date of Patent: Dec. 31, 2019

(54) COMPOSING MEDIA STORIES METHOD AND SYSTEM

(71) Applicant: RealNetworks, Inc., Seattle, WA (US)

(72) Inventor: Milko Boic, Sammamish, WA (US)

(73) Assignee: RealNetworks, Inc., Seattle, WA (US)

( * ) Notice: Subject to any disclaimer, the term of this patent is extended or adjusted under 35 U.S.C. 154(b) by 964 days.

(21) Appl. No.: 15/055,168

(22) Filed: Feb. 26, 2016

(65) Prior Publication Data

US 2016/0253356 A1    Sep. 1, 2016

Related U.S. Application Data

(60) Provisional application No. 62/163,248, filed on May 18, 2015, provisional application No. 62/126,172, filed on Feb. 27, 2015.

(51) Int. Cl.
*G06F 16/00* (2019.01)
*G06F 16/58* (2019.01)
*G06F 16/28* (2019.01)
*G06F 16/438* (2019.01)
*G06F 16/583* (2019.01)

(52) U.S. Cl.
CPC ........ *G06F 16/5866* (2019.01); *G06F 16/285* (2019.01); *G06F 16/4393* (2019.01); *G06F 16/583* (2019.01)

(58) Field of Classification Search
CPC .. G06F 16/285; G06F 16/583; G06F 16/4393; G06F 16/5866; G06F 16/9038
See application file for complete search history.

(56) References Cited

U.S. PATENT DOCUMENTS

| 7,760,956 | B2 * | 7/2010 | Lin | G06K 9/00711 |
| | | | | 382/254 |
| 7,986,372 | B2 * | 7/2011 | Ma | G06K 9/00711 |
| | | | | 348/700 |
| 9,235,575 | B1 * | 1/2016 | Xiao | G06F 16/4393 |
| 2003/0068100 | A1 * | 4/2003 | Covell | G06K 9/00711 |
| | | | | 382/305 |
| 2004/0047614 | A1 * | 3/2004 | Green | H04N 5/783 |
| | | | | 386/217 |
| 2004/0052505 | A1 * | 3/2004 | Ahmad | G11B 27/034 |
| | | | | 386/202 |
| 2004/0268397 | A1 * | 12/2004 | Dunbar | H04N 5/783 |
| | | | | 725/88 |
| 2005/0226502 | A1 * | 10/2005 | Cohen | G06K 9/00711 |
| | | | | 382/173 |
| 2006/0020597 | A1 * | 1/2006 | Keating | G06F 16/5838 |
| | | | | 707/999.006 |
| 2006/0026524 | A1 * | 2/2006 | Ma | G06K 9/00711 |
| | | | | 715/713 |
| 2006/0031917 | A1 * | 2/2006 | Winder | H04N 21/2365 |
| | | | | 725/135 |

(Continued)

*Primary Examiner* — Ashish Thomas
*Assistant Examiner* — Rezwanul Mahmood
(74) *Attorney, Agent, or Firm* — Seed IP Law Group LLP

(57) ABSTRACT

Disclosed is a method and apparatus to programmatically determine a home location for a user, to cluster photographs and videos into events and trips relative to the home location, to determine names for the events and trips, to composite stories created from the events and trips, to update the composited stories over time, and to output the composited stories for display.

25 Claims, 16 Drawing Sheets

(56) References Cited

U.S. PATENT DOCUMENTS

| | | | | |
|---|---|---|---|---|
| 2006/0080167 A1* | 4/2006 | Chen | G06Q 30/02 | 705/14.68 |
| 2007/0031062 A1* | 2/2007 | Pal | G06K 9/32 | 382/284 |
| 2007/0081813 A1* | 4/2007 | Hong | G03B 17/24 | 707/E17.026 |
| 2008/0284853 A1* | 11/2008 | Juric | H04N 17/004 | 348/192 |
| 2010/0002606 A1* | 1/2010 | Preis | H04Q 3/0025 | 370/259 |
| 2011/0064318 A1* | 3/2011 | Gao | G06F 16/70 | 382/224 |
| 2012/0087561 A1* | 4/2012 | Guetter | G06T 7/174 | 382/131 |
| 2012/0102021 A1* | 4/2012 | Hill | G06F 16/7837 | 707/711 |
| 2012/0182391 A1* | 7/2012 | Gallagher | H04N 13/211 | 348/46 |
| 2013/0336590 A1* | 12/2013 | Sentinelli | H04N 5/772 | 382/218 |
| 2014/0149427 A1* | 5/2014 | Wilder | G06F 16/44 | 707/749 |
| 2014/0161348 A1* | 6/2014 | Sutherland | G06K 9/6201 | 382/162 |
| 2014/0193048 A1* | 7/2014 | Zhang | G06K 9/00288 | 382/118 |
| 2014/0208203 A1* | 7/2014 | Tang | G06F 17/212 | 715/252 |
| 2014/0270537 A1* | 9/2014 | Lo | G06T 11/60 | 382/195 |
| 2014/0285619 A1* | 9/2014 | Acquavella | G06T 19/20 | 348/43 |
| 2014/0285624 A1* | 9/2014 | Acquavella | G06T 19/20 | 348/46 |
| 2014/0301653 A1* | 10/2014 | Murphy-Chutorian | G06K 9/00221 | 382/224 |
| 2015/0098645 A1* | 4/2015 | Leung | G06F 16/786 | 382/154 |
| 2015/0099252 A1* | 4/2015 | Anderson | G09B 19/003 | 434/257 |
| 2015/0219767 A1* | 8/2015 | Humphreys | G01S 19/43 | 342/357.26 |
| 2015/0331930 A1* | 11/2015 | Xing | G06F 17/30241 | 707/723 |
| 2016/0188997 A1* | 6/2016 | Desnoyer | G06T 7/55 | 382/190 |
| 2016/0247024 A1* | 8/2016 | Loui | G06F 16/784 | |
| 2016/0253356 A1* | 9/2016 | Boic | G06F 16/5866 | 707/724 |
| 2016/0267179 A1* | 9/2016 | Mei | G06K 9/00744 | |
| 2018/0084023 A1* | 3/2018 | Stoop | H04L 67/02 | |
| 2019/0249987 A1* | 8/2019 | Siercks | G01C 15/006 | |

* cited by examiner

COMPOSING MEDIA STORIES METHOD AND SYSTEM

BACKGROUND

With the digital age, every-day users of smartphones are capable of taking a large number of photographs and videos. Managing this large number of photographs and videos has become a challenge. A fundamental component of this challenge is clustering collections of photographs and videos into groupings which are meaningful for the user, without burdensome manual entry of metadata or selection by the user of photographs and videos to include or not include in a particular grouping. In addition, activities, such as trips, may occur across days, weeks, or months and may involve travel to multiple locations; a grouping of photographs and videos with respect to such an activity will need to be updated as time progresses. As noted, manual updating by the user is burdensome, may not be performed, or the criteria employed by the user may change and result in inconsistent and dissatisfying results. Programmatically creating groupings in such a context is challenging and may either form too many groupings or may include too many disparate items together into one group.

BRIEF SUMMARY

Disclosed is a method and apparatus to programmatically determine a home location for a user, to cluster photographs and videos into events and trips relative to the home location, to determine names for the events and trips, to composite stories created from the events and trips, to update the composited stories over time, and to output the composited stories for display.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

In relation to FIG. 1, User Device 200 is a computer which can record (such as via an internal or connected camera) or which has access to photographs and videos, hereinafter referred to as "items". User Device 200 may be, for example, a mobile phone, a "smart" phone, a tablet computer, a laptop computer, a desktop computer. An example of User Device 200 is illustrated further in FIG. 2. User Device 200 may be used by, for example, User 108.

Figure 3:
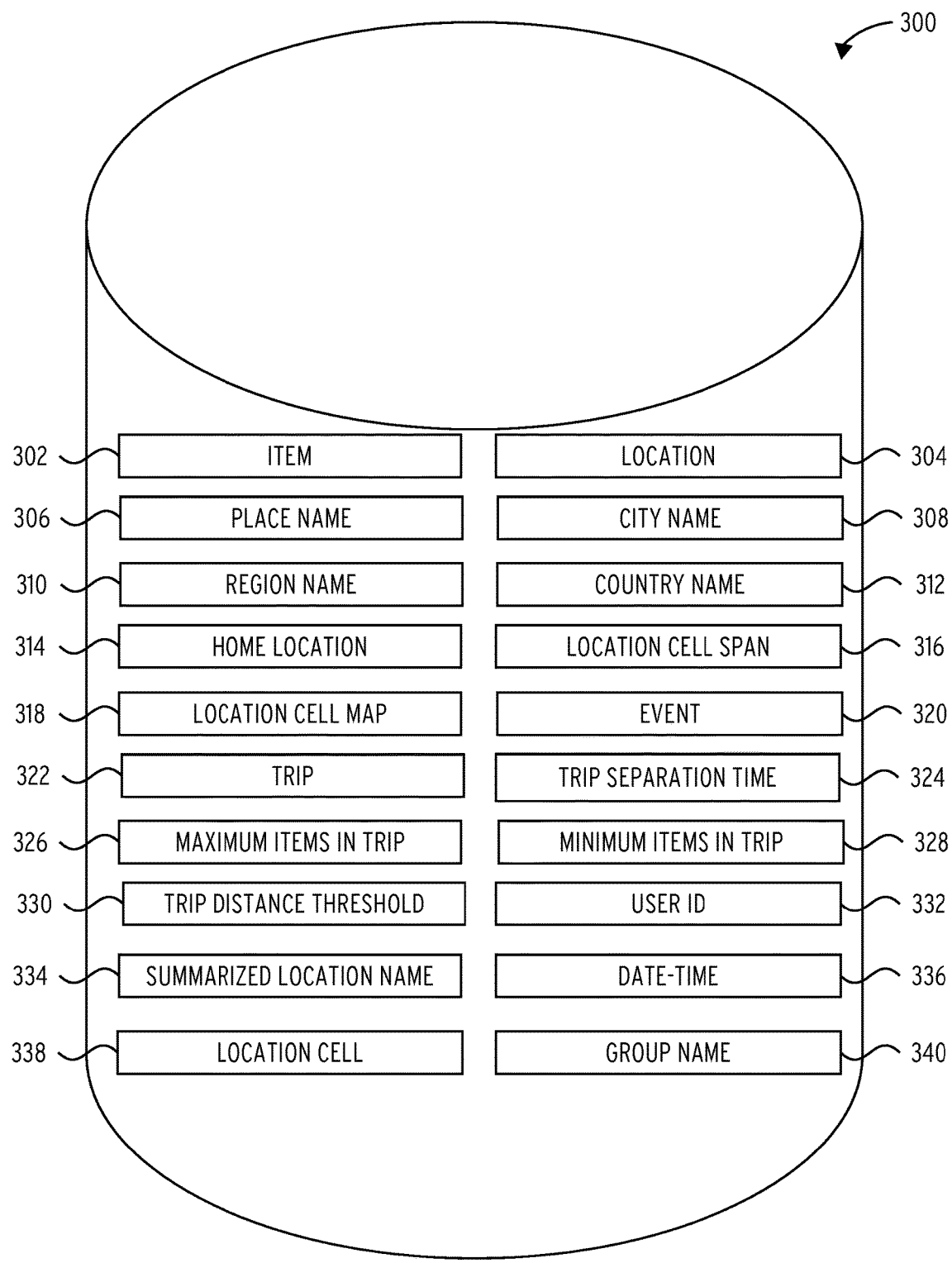
FIG. 3 is a functional block diagram of User Device Datastore illustrated in the computing device of FIG. 2 and certain memory objects therein.

User Device 200 is illustrated as comprising or being connected to User Device Datastore 300. An example of User Device Datastore 300 is illustrated further in FIG. 3. User Device Datastore 300 stores items (photographs and videos) and item metadata. Items are illustrated in FIG. 3 as Item 302 record. Item metadata may comprise, for example, a location (such as a latitude/longitude, an address, a coordinate in a map, or the like) and a date-time. Location metadata may be stored as, for example, Location 304 record. Location metadata may be obtained from, for example, a Global Positioning System ("GPS"), a location-determining system (for example, one which obtains location from triangulation of a device within a cellular, wifi, or other network), from identification of objects within an image which have a known, recorded, or otherwise determined location, from user entry, or from another like source. Date-time metadata may be, for example, a date-time when an item was recorded, a date-time when an item was imported into User Device 200 (or User Device Datastore 300), or a date-time when an item was processed by the routines discussed herein. Date-time metadata may be stored as, for example, Date-Time 336 record. Other metadata may be stored in association with items, such as camera and recording settings (shutter speed, resolution, encoding settings, file types, and the like), the type of camera used, and the like.

As discussed further herein, User Device 200 executes Determine Home Location Routine 400 to determine (and to continuously re-determine) Home Location 314 with respect to User 108. Home Location 314 is used as a reference to form clusters of Item 302 records using Form and Output Clusters Routine 600. Clusters may be organized as "events" and "trips", stored in User Device Datastore 300 as Event 320 and Trip 322. User Device 200 also executes Name Non-Trip Groups Routine 1000 and Name Trips Routine 1100 to determine meaningful names to associate with Event 320 and Trip 322 clusters.

User Device 200 also executes Select Best Items Routine 1600 to select the "best" Item 302 records within the clusters. User Device 200 also executes Composite Stories Routine 216 to composite "stories" using the "best" Item 302 records within Event 320 and Trip 322 clusters and the names assigned thereto. The stories are output when, for example, User Device 200 executes Output Composited Stories Routine 218.

Figure 2:
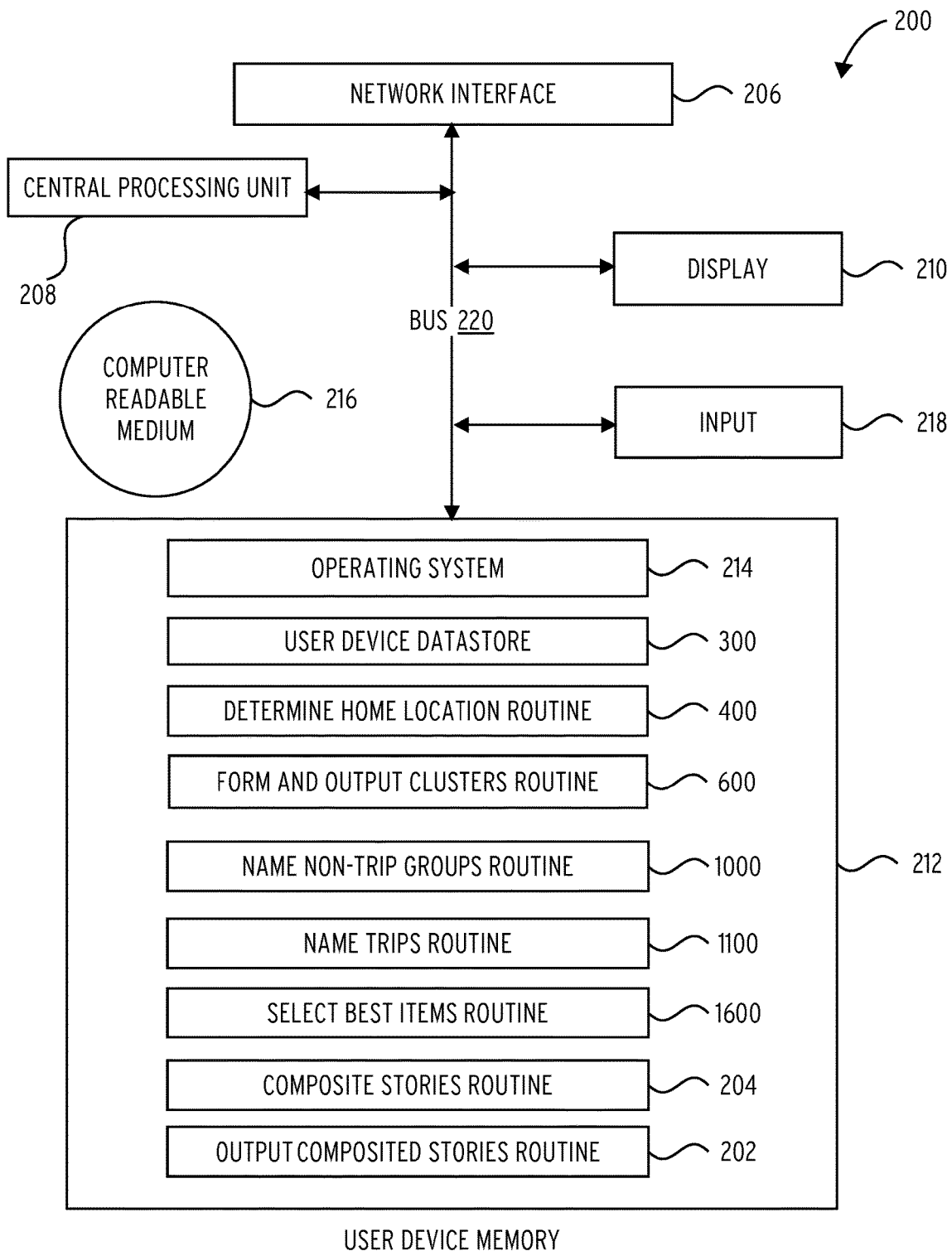
FIG. 2 is a block diagram of an exemplary User Device computing device and some data structures and/or components thereof.

Also illustrated in FIG. 2 is Story Server 104 and Story Server Datastore 106. Story Server 104 and Story Server Datastore 106 may act as User Device 200 and/or User Device Datastore 300 in a server-implemented or client-server implemented embodiment in which users record items which may be stored locally on the user device (such as User Device 200) and/or on a remote datastore, such as Story Server Datastore 106. The routines described herein may then be executed remotely, such as by one or both of User Device 200 and Story Server 104.

Figure 1:
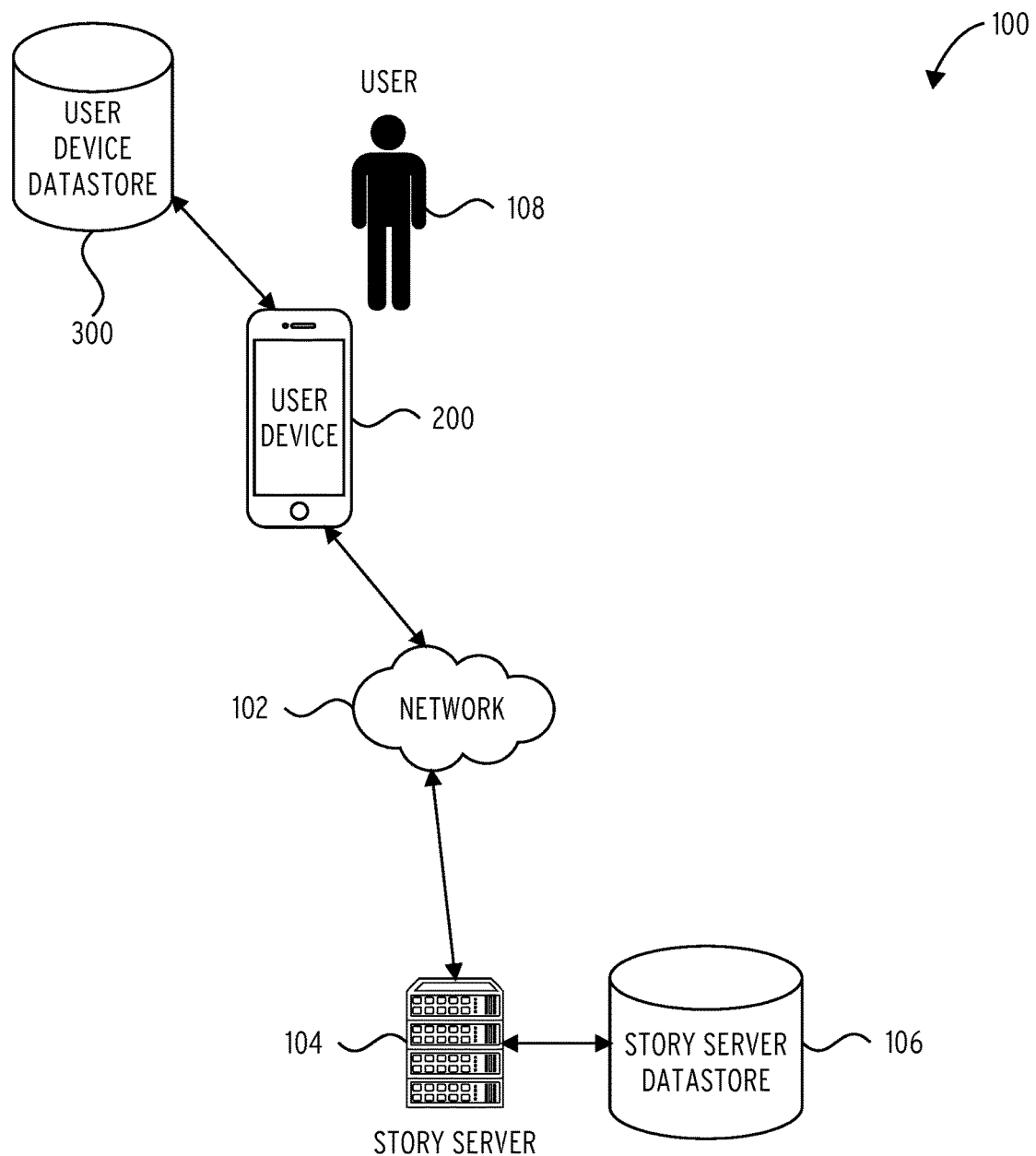
FIG. 1 is a network and device diagram illustrating an exemplary embodiment of computers and networks configured according to the disclosure herein.

Interaction among devices illustrated in FIG. 1 may be accomplished, for example, through the use of credentials to authenticate and authorize a machine or user with respect to a computer or a process executed thereby.

Network 102 comprises computers, network connections among the computers, and software routines to enable communication between the computers over the network connections. Examples of Network 102 comprise an Ethernet network, the Internet, and/or a wireless network, such as a GSM, TDMA, CDMA, EDGE, HSPA, LTE or other network provided by a wireless service provider. Connection to Network 102 may be via a Wi-Fi connection. More than one network may be involved in a communication session between the illustrated devices. Connection to Network 102 may require that the computers execute software routines which enable, for example, the seven layers of the OSI model of computer networking or equivalent in a wireless phone network.

This paper may discuss a first computer as connecting to a second computer (such as User Device 200 connecting to Story Server 104) or to a corresponding datastore (such as to Story Server Datastore 106); it should be understood that such connections may be to, through, or via the other of the two components (for example, a statement that a computing device connects with or sends data to Story Server 104 should be understood as saying that the computing device may connect with or send data to Story Server Datastore 106). References herein to "database" should be understood as equivalent to "Datastore."

Although illustrated as components integrated in one physical unit, the computers and databases may be provided by common (or separate) physical hardware and common (or separate) logic processors and memory components. Though discussed as occurring within one computing device, the software routines and data groups used by the software routines may be stored and/or executed remotely relative to any of the computers through, for example, application virtualization.

Each of the computers illustrated in FIG. 1 represent potentially more than one computer.

FIG. 2 is a functional block diagram of an exemplary User Device 200 computing device and some data structures and/or components thereof. User Device 200 in FIG. 2 comprises at least one Central Processing Unit 204, User Device Memory 212, Display 206 and Input 208, all interconnected along with Network Interface 202 via Bus 220. Central Processing Unit 204 may comprise one or more general-purpose Central Processing Units ("CPU") as well as one or more special-purpose Graphics Processing Units ("GPU"). The components of Central Processing Unit 204 may be utilized by Operating System 214 for different functions required by the routines executed by User Device 200. Network Interface 202 may be utilized to form connections with Network 102 or to form device-to-device connections with other computers.

User Device Memory 212 generally comprises a random access memory ("RAM"), a read only memory ("ROM"), and a permanent mass storage device, such as a disk drive or SDRAM (synchronous dynamic random-access memory). User Device Memory 212 stores program code for software routines, such as, for example, Determine Home Location Routine 400, Form and Output Clusters Routine 600, Name Non-Trip Groups Routine 1000, Name Trips Routine 1100, Select Best Items Routine 1600, Composite Stories Routine 216, and Output Composited Stories Routine 218, as well as, for example, browser, email client and server routines, client applications, and database applications (discussed further below). Additional data groups for routines, such as for a webserver and web browser, may also be present on and executed by User Device 200. Webserver and browser routines may provide an interface for interacting with the other computing devices illustrated in FIG. 1 or with other computing devices not illustrated in FIG. 1, for example, through webserver and web browser routines (which may serve and respond to data and information in the form of webpages and html documents or files). The browsers and webservers are meant to illustrate user-interface and user-interface enabling routines generally, and may be replaced by equivalent routines for serving and rendering information to and in a user interface in a computing device (whether in a web browser or in, for example, a mobile device application).

In addition, User Device Memory 212 also stores Operating System 214. These software components may be loaded from a non-transient Computer Readable Medium 210 into User Device Memory 212 of the computing device using a drive mechanism (not shown) associated with non-transient Computer Readable Medium 210, such as a floppy disc, tape, DVD/CD-ROM drive, memory card, or other like storage medium. In some embodiments, software components may also or instead be loaded via a mechanism other than a drive mechanism and Computer Readable Medium 210 (e.g., via Network Interface 202).

User Device 200 may also comprise hardware supporting input modalities, Input 208, such as, for example, a touchscreen, a camera, a keyboard, a mouse, a trackball, a stylus, motion detectors, and a microphone. Input 208 may also serve as Display 206, as in the case of a touchscreen display which also serves as Input 208, and which may respond to input in the form of contact by a finger or stylus with the surface of Input 208.

User Device 200 may also comprise or communicate via Bus 220 with User Device Datastore 300, illustrated further in FIG. 3. In various embodiments, Bus 220 may comprise a storage area network ("SAN"), a high speed serial bus, and/or via other suitable communication technology. In some embodiments, User Device 200 may communicate with User Device Datastore 300 via Network Interface 202. User Device 200 may, in some embodiments, include many more components than those shown in this Figure. However, it is not necessary that all of these generally conventional components be shown in order to disclose an illustrative embodiment.

FIG. 3 is a functional block diagram of User Device Datastore 300 illustrated in the computing device of FIG. 2. The components of User Device Datastore 300 are data groups used by routines. The data groups used by routines illustrated in FIG. 3 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, joins, conditional logic, tests, and similar. The components of User Device Datastore 300 are discussed further herein in the discussion of other of the Figures.

Figure 4:
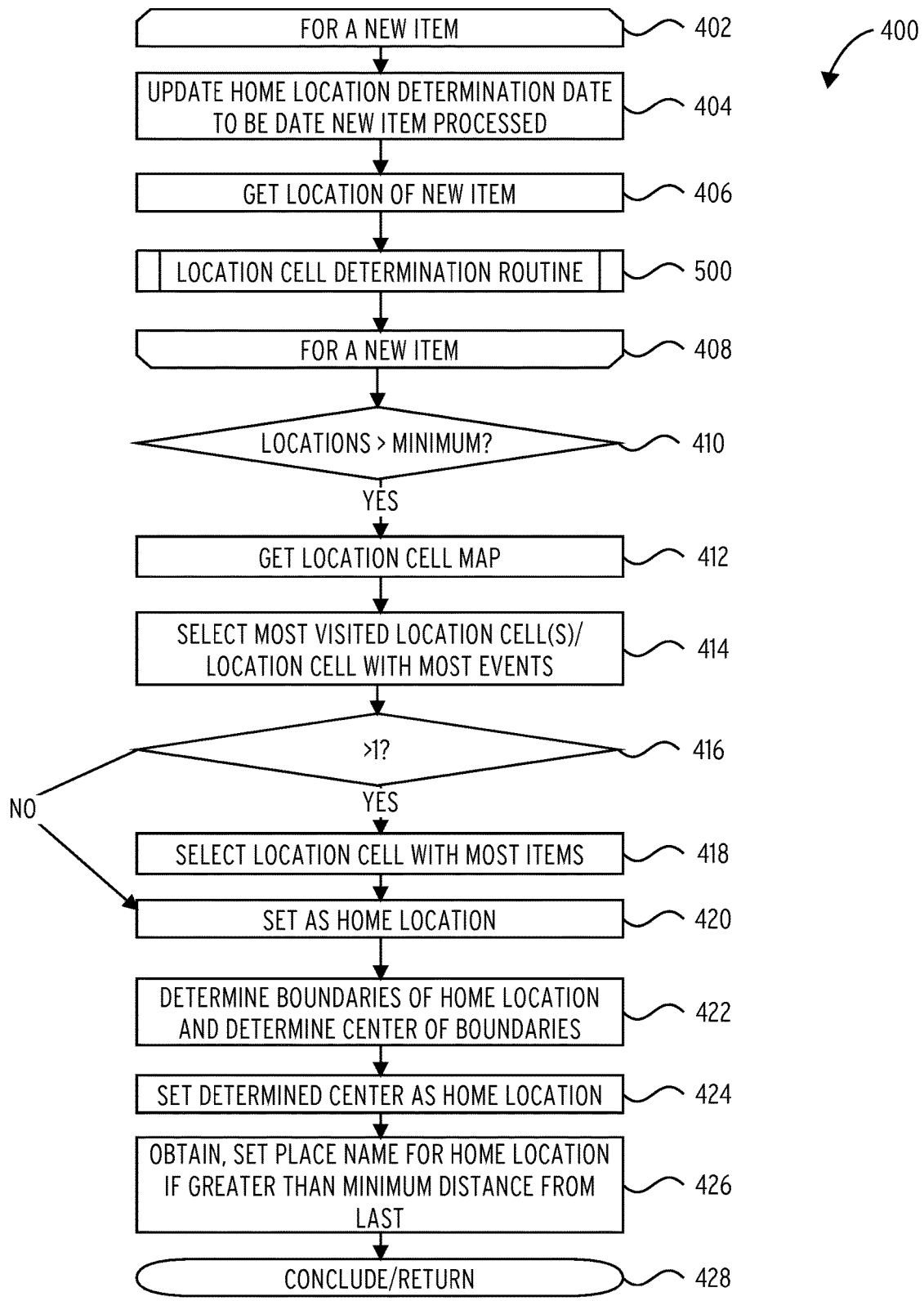
FIG. 4 is a flowchart illustrating an exemplary embodiment of Determine Home Location Routine.

In relation to FIG. 4, Determine Home Location Routine 400 may be executed by, for example, User Device 200, as User Device 200 receives Item 302, such as new photographs and videos which may have been taken by or otherwise made available to User Device 200.

Block 402 to block 408 iterate over each new Item 302. At block 404, Determine Home Location Routine 400 updates a home location determination date-time to be the date-time when the then-current new Item 302 is being processed. The purpose of this is to record when Home Location 314 was last updated.

At block 406, Determine Home Location Routine 400 may obtain location metadata for the new Item 302. The location data may be obtained from, for example, metadata associated with or embedded in Item 302, from a device which recorded Item 302, or from user input. The location data may be stored as, for example, a Location 304 record.

At block 500, Determine Home Location Routine 400 may execute Location Cell Determination Routine 500 as a subroutine to determine Location Cell 338 record with respect to the then-current Item 302.

At block 408, Determine Home Location Routine 400 may return to block 402 to iterate over the next new Item 302. Determine Home Location Routine 400 may also proceed to decision block 410.

At decision block 410, Determine Home Location Routine 400 may determine whether a minimum number of Location 304 records have been created. For example, a minimum number of 10 Location 304 records may be required for Determine Home Location Routine 400 to proceed. If the minimum number of Location 304 records have not been created (this fork not illustrated), Determine Home Location Routine 400 may conclude or return to a process which may have spawned it (such as at block 428) or may return to block 402 (if it has not returned to block 402 already).

At block 412, a minimum number of Location 304 records have been created and Determine Home Location Routine 400 obtains Location Cell Map 318, which has, indicates, or otherwise records all Location Cell 338 records associated with the user.

At block 414, Determine Home Location Routine 400 identifies or selects one or more Location Cell 338 records in Location Cell Map 318 which have been visited the most often by the user. This selection or identification may be, for example, according to which Location Cell 338 is associated with the most Event 320 records, which Location Cell 338 has the most number of days when Item 302 records were recorded in the Location Cell 338 and the like.

At decision block 416, Determine Home Location Routine 400 determines whether more than one Location Cell 338 were visited the most an equal number of times (e.g. three Location Cells were visited more than all others, but were visited an equal number of times).

If affirmative at decision block 416, then at block 418, Determine Home Location Routine 400 selects from within the group which were visited the most an equal number of times, the Location Cell 338 which has the most number of Item 302 records.

At block 420, which may follow decision block 416, Determine Home Location Routine 400 sets the Location Cell 338 which was visited most often or which has the most number of Item 302 records as the Location Cell 338 containing Home Location 314 for the user.

At block 422, Determine Home Location Routine 400 determines the boundaries of the Location Cell 338 containing Home Location 314, according to the coordinates of Location 304 records associated with Item 302 records in the Location Cell 338. For example, Determine Home Location Routine 400 may obtain the minimum and maximum latitude and longitude of all Location 304 records of Item 302 records in the Location Cell 338, which information will define the boundaries of the Location Cell 338. For example, a rectangle may be drawn to encompass the identified coordinates.

At block 424, Determine Home Location Routine 400 may determine the center of the boundaries determined at block 422 and may set this center as Home Location 314. Alternatives include identifying a building which is visited most often in the Location Cell 338, identifying an address of user, such as a reported home address of the user, or the like. However, the described approach provides an approximate answer with low computation cost and which does not require input.

At block 426, Determine Home Location Routine 400 may obtain a place name for Home Location 314, such as a City, Region, County, State, Country name, or the like, including common nicknames thereof. The obtained place name may be set as the place name for Home Location 314 if Home Location 314 has changed by more than a threshold amount relative to the last time Home Location 314 was determined.

At done block 428, Determine Home Location Routine 400 may conclude or return to a process which spawned it.

Figure 5:
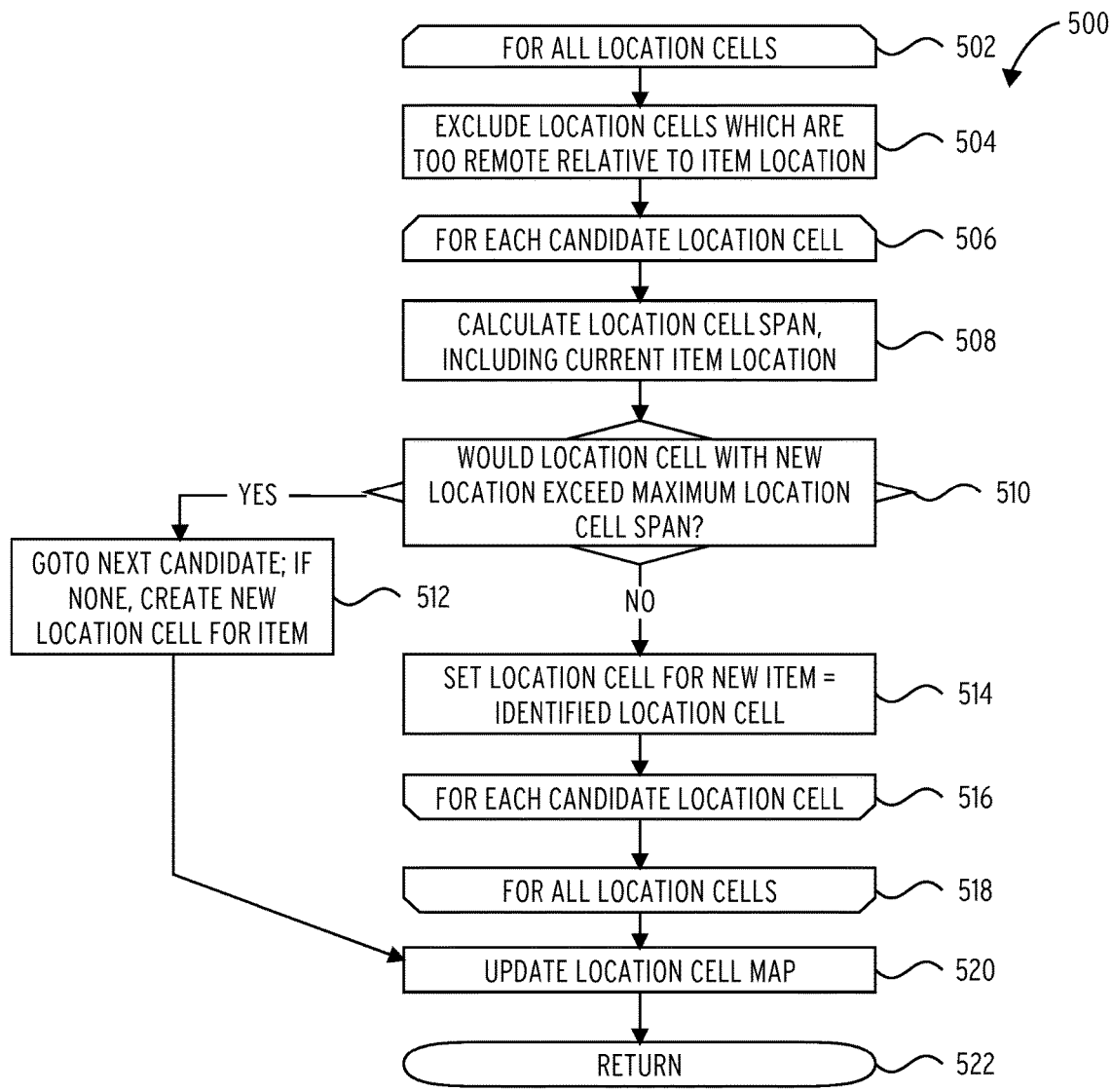
FIG. 5 is a flowchart illustrating an exemplary embodiment of Location Cell Determination Routine.

In relation to FIG. 5, Location Cell Determination Routine 500 may be executed by, for example, User Device 200 as a subroutine within Determine Home Location Routine 400 or as an independent routine. With respect to a then-current Item 302, opening loop block 502 to closing loop block 518 iterate over all then currently existing Location Cell 338 records.

At block 504, Location Cell Determination Routine 500 may exclude Location Cell 338 records which are too remote relative to Location 304 of the then-current Item 302. For example, excluded may be all Location Cell 338 records where the minimum longitude of the Location Cell 338 record is greater than the sum of then-current Item 302 longitudinal value plus the Location Cell Span 316 longitudinal value (potentially as multiplied by a safety factor, such as 1.5). A similar exclusion may be applied in a latitudinal orientation.

Opening loop block 506 to closing loop block 516 may iterate for each candidate Location Cell 338 record not excluded at block 504.

At block 508, Location Cell Determination Routine 500 may calculate what the Location Cell Span would be for the then-current candidate Location Cell 338 record, if such record contained the then-current Location 304 record being evaluated. At decision block 510, a determination may be made regarding whether the potential Location Cell Span calculated at block 508 would exceed the Location Cell Span 316 record value. The Location Cell Span 316 record value sets a maximum allowed Location Cell Span, for example, 45 miles. The Location Cell Span may be the distance between Location 304 coordinates in a Location Cell 338; the distance may be a horizontal distance, a vertical distance, or a radial distance.

If at decision block 510 the determination is that the candidate Location Cell 338 record would exceed the Location Cell Span 316 record value if it included the Location 304 record then being evaluated, then at block 512, Location Cell Determination Routine 500 may proceed to the next candidate Location Cell 338. If there is no next candidate Location Cell 338, Location Cell Determination Routine 500 may create a new Location Cell 338 for the then-current Item 302 being evaluated and may then proceed to block 520.

If at decision block 510 the determination is that the candidate Location Cell 338 record would not exceed the Location Cell Span 316 record value if it included the Location 304 record then being evaluated, then at block 514, the identified candidate Location Cell 338 may be set as the Location Cell 338 for the then-current Item 302 being evaluated and the number of Item 302 records associated with such Location Cell 338 may be incremented. Location Cell Determination Routine 500 may then proceed to block 520, without processing further candidate Location Cell 338 records.

At block 520, Location Cell Determination Routine 500 may update Location Cell Map 318 to reflect the new Location Cell 338 record and/or to reflect a Location Cell 338 record which has received another Item 302.

At done block 522, Location Cell Determination Routine 500 may conclude or return to a process which spawned it.

Figure 6:
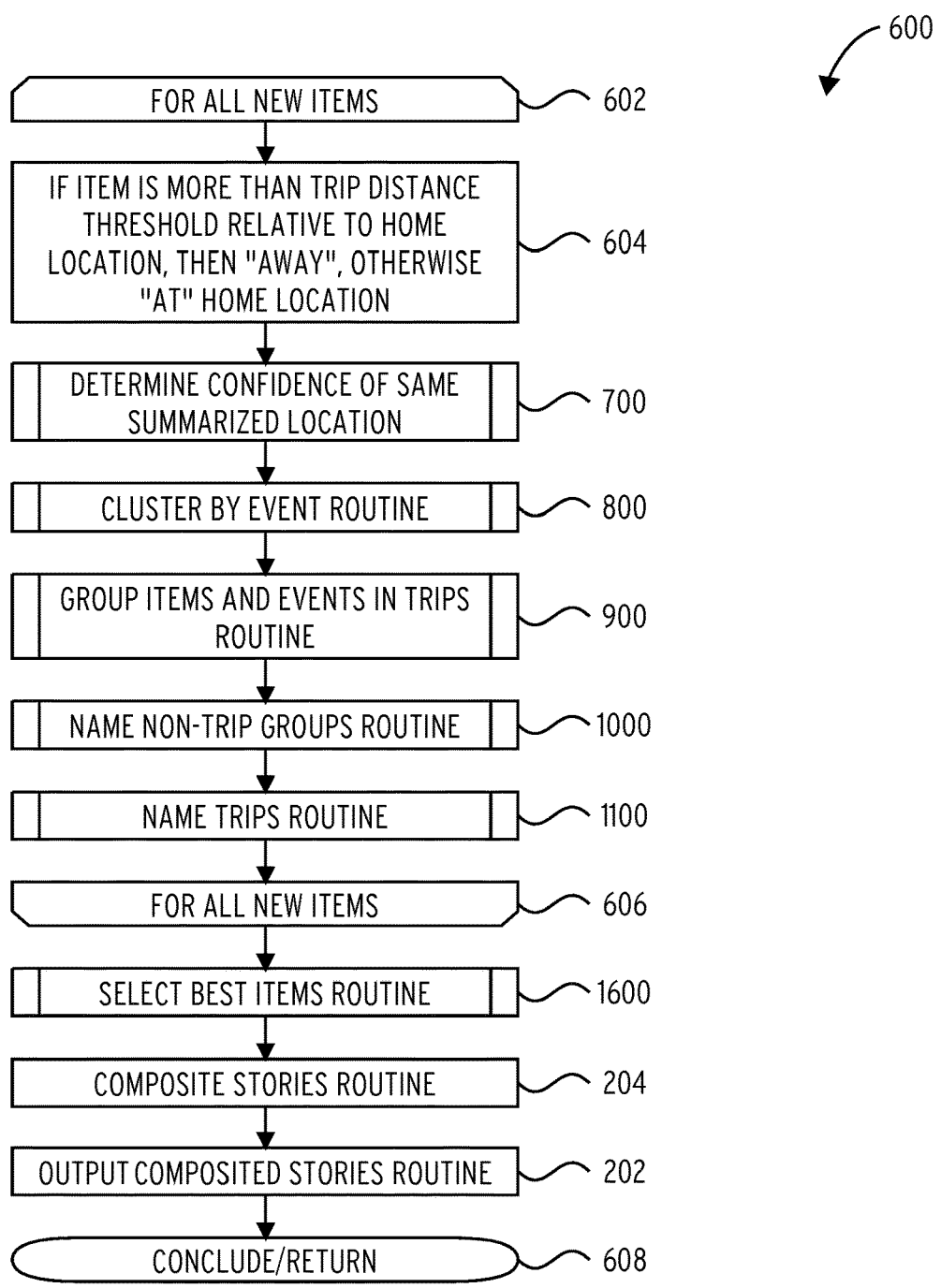
FIG. 6 is a flowchart illustrating an exemplary embodiment of Form and Output Clusters Routine.

In relation to FIG. 6, Form and Output Clusters Routine 600 may be executed by, for example, User Device 200.

Opening loop block 602 to closing loop block 606 may iterate for all new Item 302 records.

At block 604, Form and Output Clusters Routine 600 may determine whether a new Item 302 is "at" or "away" from Home Location 314 (as Home Location 314 may have been determined by Determine Home Location Routine 400 routine). This determination may be based on, for example, whether a Location 304 record associated with the new Item 302 is more than Trip Distance Threshold 330 distant from Home Location 314. Trip Distance Threshold 330 may be, for example, 60 miles. Calculation of distance between Home Location 314 and Location 304 then-being considered may be a Pythagorean distance calculated using latitude and longitude or it may be a distance along a shortest road-route.

At block 700, Form and Output Clusters Routine 600 may execute Determine Confidence of Same Summarized Location Routine 700, to determine a confidence level with respect to whether two or more new Item 302 records were recorded at the same location, which may be used in clustering Item 302 records in Events and Trips.

At block 800, Form and Output Clusters Routine 600 may execute Cluster by Event Routine 800, to cluster Item 302 records into Event 320 clusters.

At block 900, Form and Output Clusters Routine 600 may execute Group Items and Events in Trips Routine 900, to cluster Item 302 and Event 320 records into Trip 322 clusters.

At block 1000, Form and Output Clusters Routine 600 may execute Name Non-Trip Groups Routine 1000, to determine names for non-trip clusters (such as Event 320 clusters).

At block 1100, Form and Output Clusters Routine 600 may execute Name Trips Routine 1100, to cluster Item 302 and Event 320 records into Trip 322 clusters.

At block 606, Form and Output Clusters Routine 600 may return to opening loop block 602 to iterate over the next new Item 302 record (if any) and/or may proceed to block 1600 to execute Select Best Items Routine 1600. Select Best Items Routine 1600 may select the best Item 302 records in the clusters created in block 800 and block 900, such as according to which Item 302 records contain photographs which are least blurry, or which contain faces, or which contain videos which meet criteria for being interesting and of higher quality.

At block 216, Form and Output Clusters Routine 600 may execute Composite Stories Routine 216. Composite Stories Routine 216 obtains the output of Select Best Items Routine 1600, selects approximately equal numbers of photographs and videos, obtains the clusters determined by Cluster by Event Routine 800 and Group Items and Events in Trips Routine 900, obtains the names assigned thereto by Name Non-Trip Groups Routine 1000 and Name Trips Routine 1100, and combines these in a structured graphical output container.

At block 218, Form and Output Clusters Routine 600 may then output the result of Composite Stories Routine 216. The output may be in a graphical user interface of a display application executed by User Device 200. The display application may be executed entirely by User Device 200 or the output may be sent to a server, such as a social media server, which server may make the output thereof available to User Device 200. An example of a social media server is illustrated in FIG. 1 as Story Server 104

At done block 608, Form and Output Clusters Routine 600 may conclude or may return to a process which spawned it.

Figure 7:
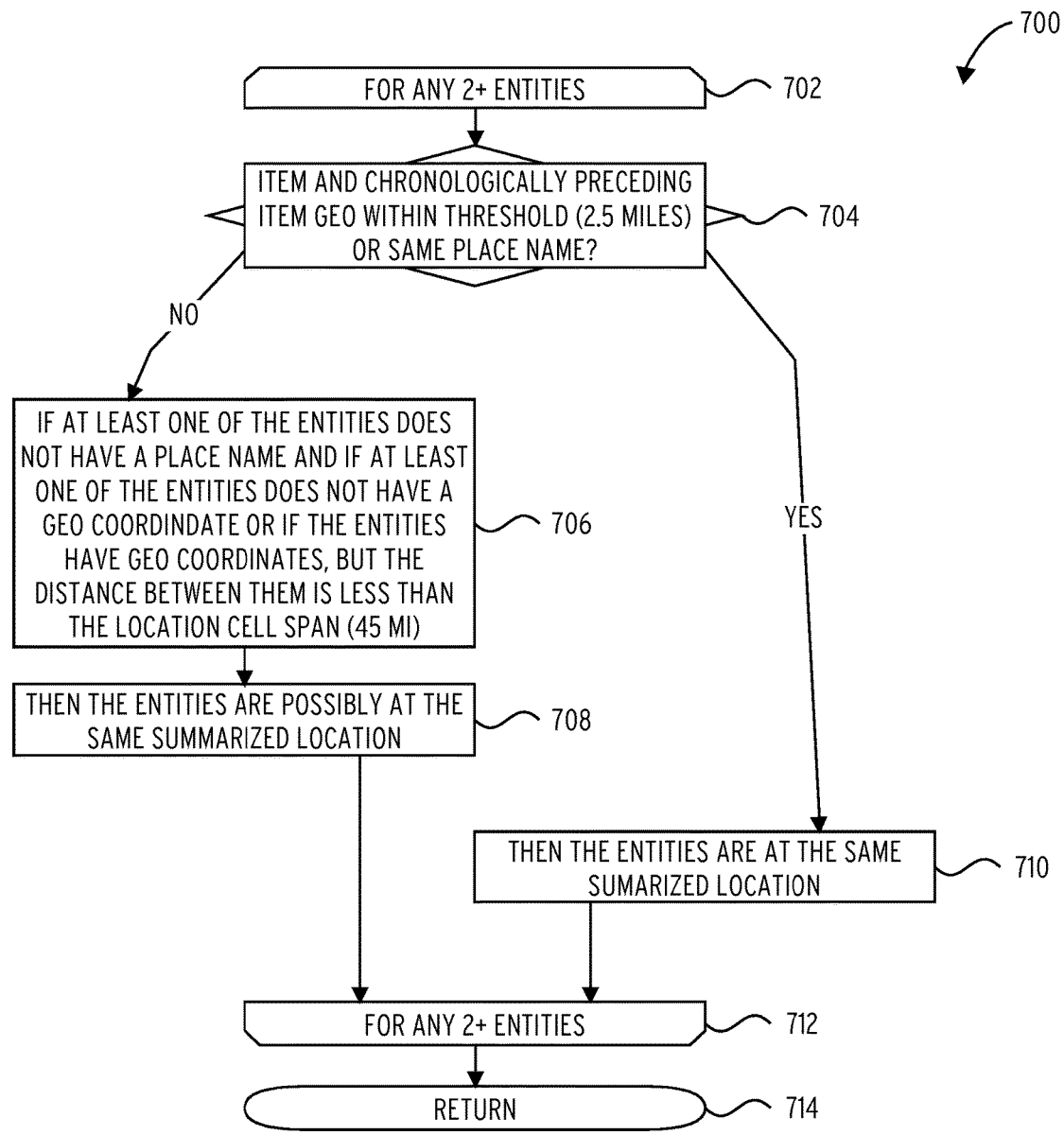
FIG. 7 is a flowchart illustrating an exemplary embodiment of Determine Confidence of Same Summarized Location Routine.

In relation to FIG. 7, Determine Confidence of Same Summarized Location Routine 700 may be executed by, for example, User Device 200, as a subroutine of Form and Output Clusters Routine 600 or as an independent routine.

Opening loop block 702 to closing loop block 712 may iterate for any two or more "Entities". As used herein, an "Entity" is an Event 320 record or an Item 302 record. Event 320 records and Item 302 records may be associated with a Location 304 record and a Place Name 306 record. Determine Confidence of Same Summarized Location Routine 700 may be executed relative to Entities which occur within a time period relative to one another.

At decision block 704, Determine Confidence of Same Summarized Location Routine 700 may determine whether a geolocation, such as a latitude and longitude, or an address, for an Item 302 and a chronologically preceding Item 302, which may be part of an Entity, are within a threshold distance, such as 2.5 miles, or whether the two or more Items have the same Place Name 306 record.

If, at decision block 704, the determination was affirmative, then at block 710 Determine Confidence of Same Summarized Location Routine 700 may record that the two or more Entities are at the same summarized location or may otherwise record a value to indicate a relatively high confidence that the two or more Entities are at or were recorded at or near the same summarized location.

If, at decision block 704, the determination was negative, then at block 706 Determine Confidence of Same Summarized Location Routine 700 may determine whether at least one of the Entities does not have a Place Name 306 record and i) if at least one of the Entities also does not have a geolocation coordinate or address or ii) if the Entities have a geolocation coordinate or address and the distance between them is less than the Location Cell Span 316 record value (for example, 45 miles), then at block 708 Determine Confidence of Same Summarized Location Routine 700 may record that the two or more Entities are possibly at the same summarized location or may otherwise record a value to indicate a relatively low confidence that the two or more Entities are at or were recorded at or near the same summarized location.

At done block 714, Determine Confidence of Same Summarized Location Routine 700 may conclude or return to a process which spawned it.

Figure 8:
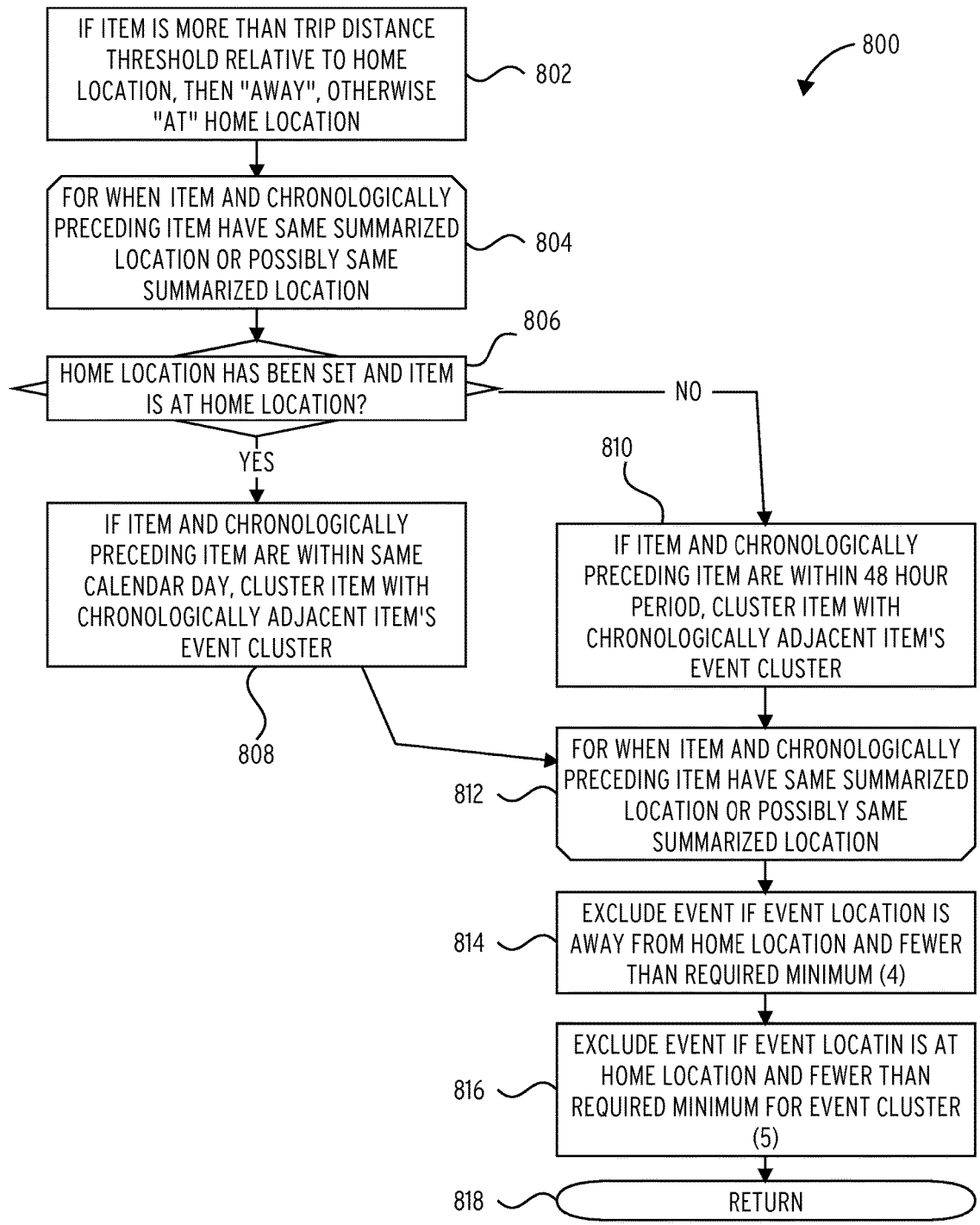
FIG. 8 is a flowchart illustrating an exemplary embodiment of Cluster by Event Routine.

In relation to FIG. 8, Cluster by Event Routine 800 may be executed by, for example, User Device 200, as a subroutine of Form and Output Clusters Routine 600 or as an independent routine.

At block 802, Cluster by Event Routine 800 may determine whether an Item 302 record (or Location 304 record associated with Item 302 record) is away from Home Location 314 by more than a threshold, such as Trip Distance Threshold 330, which may be, for example, 60 miles. If Item 302 record is more than Trip Distance Threshold 330 distant from Home Location 314, then Cluster by Event Routine 800 may set a value to record that the Item 302 record is "away" from Home Location 314; otherwise, Cluster by Event Routine 800 may set a value to record that the Item 302 record is "at" from Home Location 314.

Opening loop block 804 to closing loop block 812 may iterate over Item 302 records which have the same summarized location or possibly the same summarized location, as may have been determined by, for example, Determine Confidence of Same Summarized Location Routine 700.

At decision block 806, Cluster by Event Routine 800 may determine for an Item 302 record where a Home Location 314 has been set, whether Item 302 is at Home Location 314. If affirmative at decision block 806, then at block 808, if Item 302 and the chronologically preceding Item 302 are within the same calendar day, then cluster Item 302 with the Event 320 cluster of the chronologically adjacent Item 302.

If negative at decision block 806 (meaning that Item 302 is not at Home Location 314), then at block 810, if Item 302 and the chronologically preceding Item 302 are within a 48 hour period, then cluster Item 302 with the Event 320 cluster of the chronologically adjacent Item 302.

If Item 302 cannot be clustered with a chronologically adjacent Item 302, then Item 302 may be treated as a stand-alone Event 320, however a different number of Item 302 records may be required to form an Event 320 "at" or "away" from Home Location 314. For example, at block 814, Cluster by Event Routine 800 may exclude an Event 320 record if Location 304 for Event 320 record is "away" from Home Location 314 and has or is associated with fewer than a required minimum Item 302 records for an Event 320 record away from Home Location 314, such as, for example, 4.

At block 816, Cluster by Event Routine 800 may exclude an Event 320 record if Location 304 for Event 320 record is "at" from Home Location 314 and has or is associated with fewer than a second required minimum Item 302 records for an Event 320 record at Home Location 314, such as, for example, 5.

At done block 818, Cluster by Event Routine 800 may conclude or return to a process which spawned it.

Figure 9:
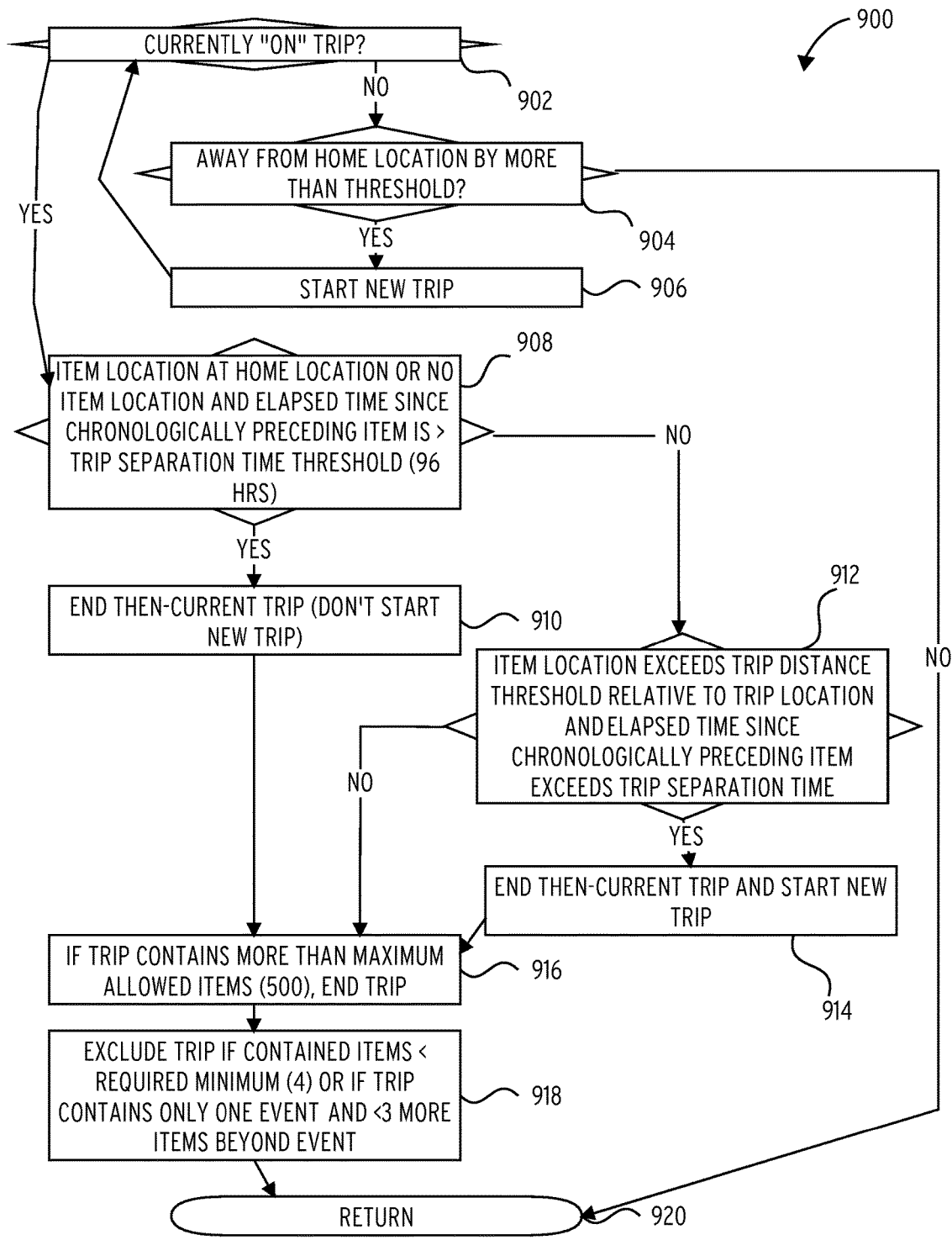
FIG. 9 is a flowchart illustrating an exemplary embodiment of Group Items and Events in Trips Routine.

In relation to FIG. 9, Group Items and Events in Trips Routine 900 may be executed by, for example, User Device 200, as a subroutine of Form and Output Clusters Routine 600 or as an independent routine.

At decision block 902, Group Items and Events in Trips Routine 900 may determine whether a then-current Item 302 was on a Trip. If affirmative the process may proceed to decision block 908 (discussed below).

If negative, then at decision block 904 a determination may be made regarding whether such Item 302 (or Location 304 record associated with Item 302 record) was away from Home Location 314 by more than a threshold, such as Trip Distance Threshold 330, which may be, for example, 60 miles. This determination may have been performed by, for example, Cluster by Event Routine 800, block 802. If negative at decision block 904, then Group Items and Events in Trips Routine 900 may proceed to done block 920.

If Affirmative at decision block 904, then at block 906, Group Items and Events in Trips Routine 900 may create a new Trip 322 record, recording that a Trip has started. If the new Item 302 is part of or associated with an Event 320 record, then Group Items and Events in Trips Routine 900 may associate the Event 320 record with the new Trip 322 record. Group Items and Events in Trips Routine 900 may then return to decision block 902 and then proceed to decision block 908.

At decision block 908, Group Items and Events in Trips Routine 900 may determine whether Item 302 does not have a Location 304 or has a Location 304 record which is at Home Location 314, and when the elapsed time since the chronologically preceding Item 302 is greater than a threshold, such as a value in, for example, Trip Separation Time 324 record. For example, Trip Separation Time 324 record may define a threshold of 96 hours (4 days).

If affirmative at decision block 908, Group Items and Events in Trips Routine 900 may proceed to block 910 and may stop adding Item 302 records to the then-current Trip 322 record, indicating that the Trip has ended.

If negative at decision block 908, at decision block 912 Group Items and Events in Trips Routine 900 may determine whether Location 304 record of the Item 302 has exceeded a distance threshold relative to Location 304 record of the then-current Trip 322, such as Trip Distance Threshold 330 and whether the elapsed time since the chronologically preceding Item 302 in Trip 322 has exceeded a temporal threshold, such as a value in Trip Separation Time 324 record. Both criteria may need to be met for an affirmative response at decision block 912. If negative at decision block 912, then Group Items and Events in Trips Routine 900 may proceed to block 916.

If affirmative at decision block 912, then at block 914 Group Items and Events in Trips Routine 900 may end the then-current Trip 322 record, such as by adding no more Item 302 records to the Trip 322 record, and may start a new Trip 322 record for the then then-current Item 302.

At block 916, Group Items and Events in Trips Routine 900 may end a Trip 322 record if it contains or is associated with greater than a maximum number of allowed Items in a Trip 322, such as Maximum Items in Trip 326, which may be, for example, 500.

At block 918, Group Items and Events in Trips Routine 900 may exclude a Trip 322 if it contains fewer than a required minimum number of Item 302 records (such as 4) or if it contains only one Event 320 record (and all Item 302 records in such Event 320) and fewer than 3 Item 302 records beyond those in the one Event 320. In such cases, the Item 302 records in the Event 320 may be grouped only in the Event 320 record, and not in a Trip.

At done block 920, Group Items and Events in Trips Routine 900 may conclude or return to a process which spawned it.

Figure 10:
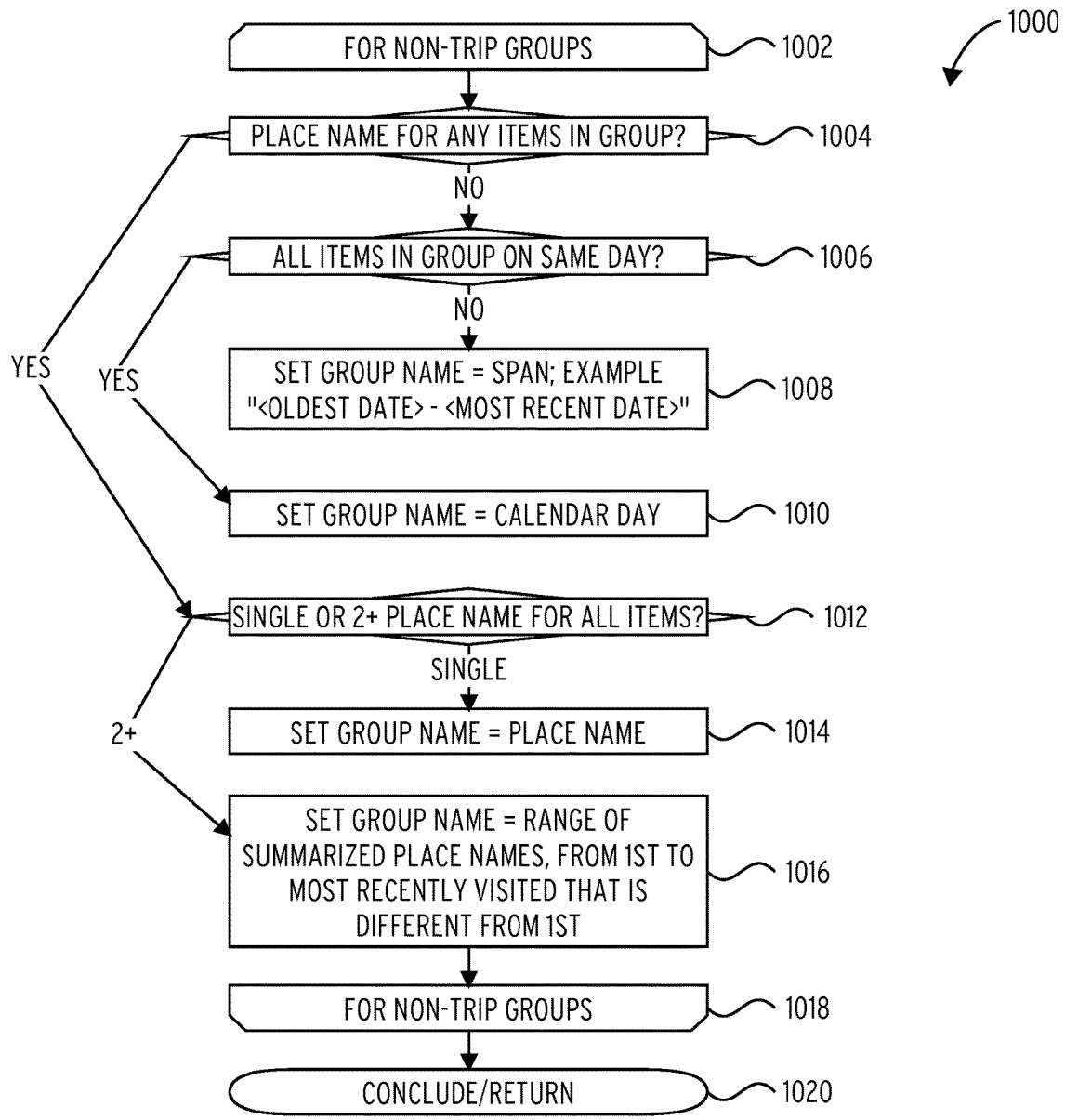
FIG. 10 is a flowchart illustrating an exemplary embodiment of Name Non-Trip Groups Routine.

In relation to FIG. 10, Name Non-Trip Groups Routine 1000 may be executed by, for example, User Device 200, as a subroutine of Form and Output Clusters Routine 600 or as a stand-alone routine. Name Non-Trip Groups Routine 1000 may be executed to determine a name or identifier for one or more non-trip groups, such as an Event 320 record.

Opening loop block 1002 to closing loop block 1018 may iterate over non-trip groups which have not previously been named.

At decision block 1004, Name Non-Trip Groups Routine 1000 may determine whether there are any place names for any Item 302 in the then-current non-trip group. A place name is a geographic identifier, such as the name of a continent, country, a state, a county, a parish, a city, a neighborhood, a park, a landmark, and the like. Place names may be organized in a hierarchical set of records, arranged with larger geographic units (such as countries) at the "top" levels. Examples of place name records are illustrated in User Device Datastore 300 as Place Name 306, Region Name 310, City Name 308, and Country Name 312; these records may be collapsed into the Place Name 306 record if it is understood that this represents a hierarchical set of records for geographic units. Place names may be identified based on a Location 304 record associated with an Item 302, Event 320, or Trip 322 record. When identifying a Generally, no place name may occur when there is no or an empty Location 304 record for the group then being evaluated.

If negative at decision block 1004, then at decision block 1006 Name Non-Trip Groups Routine 1000 may determine whether all Item 302 records in the then-current group occur on the same day or in another temporal window. If negative at decision block 1006, then at block 1008, Name Non-Trip Groups Routine 1000 may set a Group Name 340 record for the non-trip group to be equal to a temporal span such as, for example, "<oldest date>-<most recent date>", for example "Dec. 1, 2014-Dec. 3, 2014". Redundant terms may be omitted, for example, "Dec. 1-3, 2014". Different time/date formats may be used. Name Non-Trip Groups Routine 1000 may then return to opening loop block 1002 or may proceed to done block 1020.

If affirmative at decision block 1004, then at decision block 1012 Name Non-Trip Groups Routine 1000 may determine if there is a singe place name or two or more place names for all Item 302 records in the group being evaluated. If there is a single place name, then at block 1014, Name Non-Trip Groups Routine 1000 may set a Group Name 340 record for the non-trip group to be equal to to the single place name. Identification of a single place name may be with reference to a single place name at or below a selected level in the hierarchy of place names (such as at or below a "state" or "city" level). The selected level may be relative to Home Location 314. For example, within a close range of Home Location 314, the selected level may be lower in the hierarchy of place names, whereas further from Home Location 314, the selected level may be higher in the hierarchy of place names.

If two or more place names were determined at decision block 1012, then at block 1016, Name Non-Trip Groups Routine 1000 may set a Group Name 340 record for the group to be equal to a range of summarized place names associated with the group, from the first one visited to the most recently visited one which is different from the first.

At done block 1020, Name Non-Trip Groups Routine 1000 may conclude or return to a process which spawned it.

Figure 11:
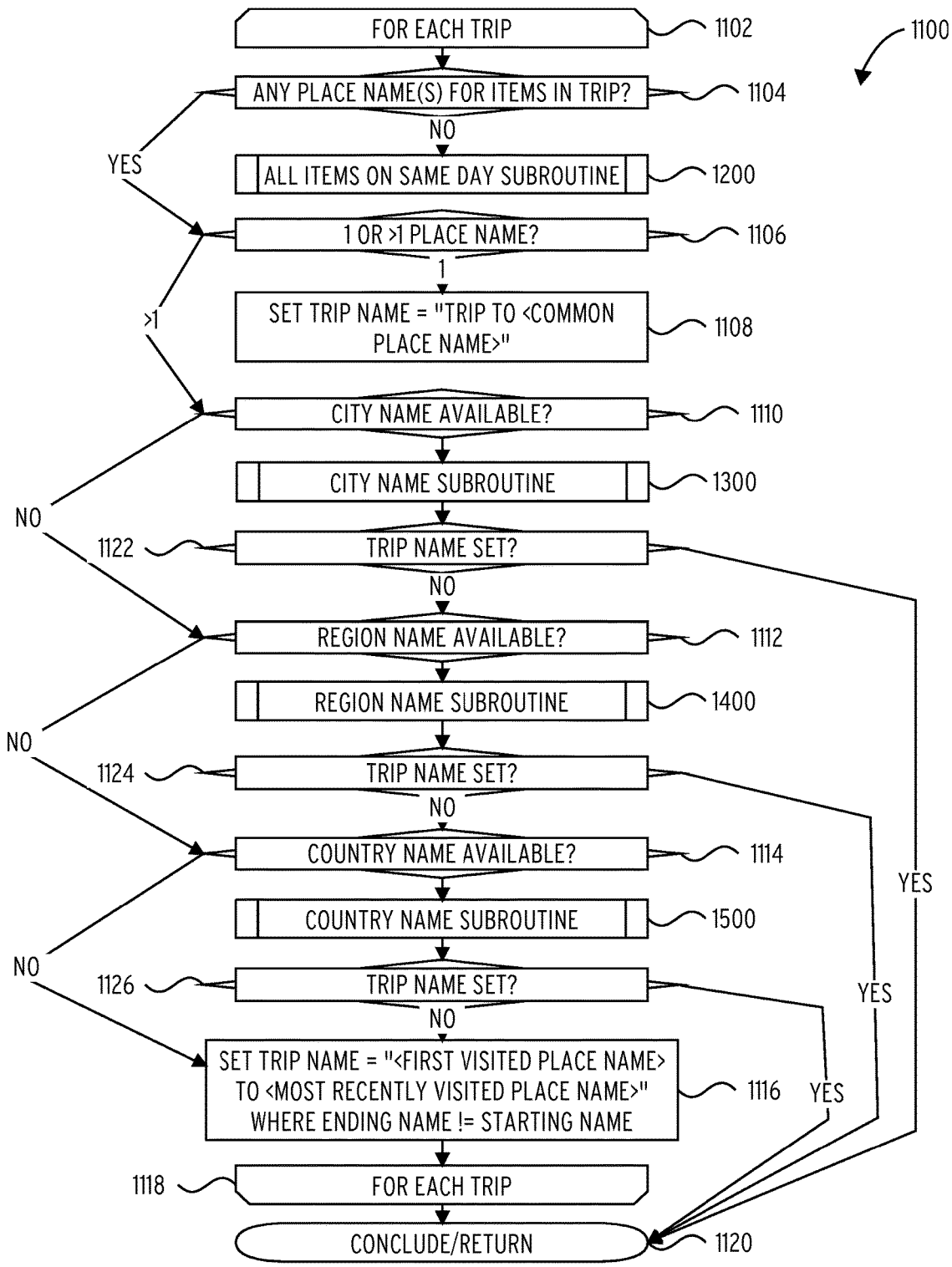
FIG. 11 is a flowchart illustrating an exemplary embodiment of Name Trips Routine.

In relation to FIG. 11, Name Trips Routine 1100 may be executed by, for example, User Device 200, as a subroutine of Form and Output Clusters Routine 600 or as a stand-alone routine. Name Trips Routine 1100 may be executed to determine a name or identifier for one or more trip groups, such as a Trip 322 record. The determined name or identifier may be stored as, for example, a Group Name 340 record.

Opening loop block 1102 to closing loop block 1118 may iterate over each un-named trip group.

At decision block 1104, Name Trips Routine 1100 may determine whether there are any place names for Item 302 records in or associated with the then-current Trip 322 record. If negative, then at All Items on Same Day Subroutine 1200, Name Trips Routine 1100 may assign a place name derived from a date or date range across which Item 302 records in the Trip 322 were recorded.

If affirmative at decision block 1104, Name Trips Routine 1100 may proceed to decision block 1106, at which Name Trips Routine 1100 may determine whether there is one common place name or more than one place name for Item 302 records associated with the then-current Trip. If one common place name is determined, then at block 1108, Name Trips Routine 1100 may set the Group Name 340 for the Trip 322 record to comprise the common place name; for example, the Group Name 340 may be set to, "Trip to <common place name>". For example, <common place name> may be, for example, "Olympic National Park".

If more than one place name is determined at decision block 1106, then Name Trips Routine 1100 may proceed to decision block 1110 and determine if at least one City Name 308 is present in the more than one place name. If affirmative, Name Trips Routine 1100 may proceed to City Name Subroutine 1300 to determine a Group Name 340 comprising City Name 308. At decision block 1122, Name Trips Routine 1100 may determine whether a Group Name 340 was set by City Name Subroutine 1300. If affirmative, then Name Trips Routine 1100 may proceed to done block 1120; if negative, then Name Trips Routine 1100 may proceed to decision block 1112.

If negative at decision block 1110, then Name Trips Routine 1100 may proceed to decision block 1112 and may determine if at least one Region Name 310 is present in the more than one place name. If affirmative, Name Trips Routine 1100 may proceed to Region Name Subroutine 1400 to determine a Group Name 340 comprising Region Name 310. At decision block 1124, Name Trips Routine 1100 may determine whether a Group Name 340 was set by Region Name Subroutine 1400. If affirmative, then Name Trips Routine 1100 may proceed to done block 1120; if negative, then Name Trips Routine 1100 may proceed to decision block 1114.

If negative at decision block 1112, then Name Trips Routine 1100 may proceed to decision block 1114 and may determine if at least one Country Name 312 is present in the more than one place name. If affirmative, Name Trips Routine 1100 may proceed to Country Name Subroutine 1500 to determine a Group Name 340 comprising Country Name 312. At decision block 1126, Name Trips Routine 1100 may determine whether a Group Name 340 was set by Country Name Subroutine 1500. If affirmative, then Name Trips Routine 1100 may proceed to done block 1120; if negative, then Name Trips Routine 1100 may proceed to block 1116.

If negative at decision block 1114, Name Trips Routine 1100 may, at block 1116, set Group Name 340 for the then-current Trip 322 record to comprise the first visited place name and the most recently visited place name, where the ending place name does not equal the starting name.

After iterating through all unnamed Trip 322 records, at done block 1120, Name Trips Routine 1100 may conclude or return to a process which spawned it.

Figure 12:
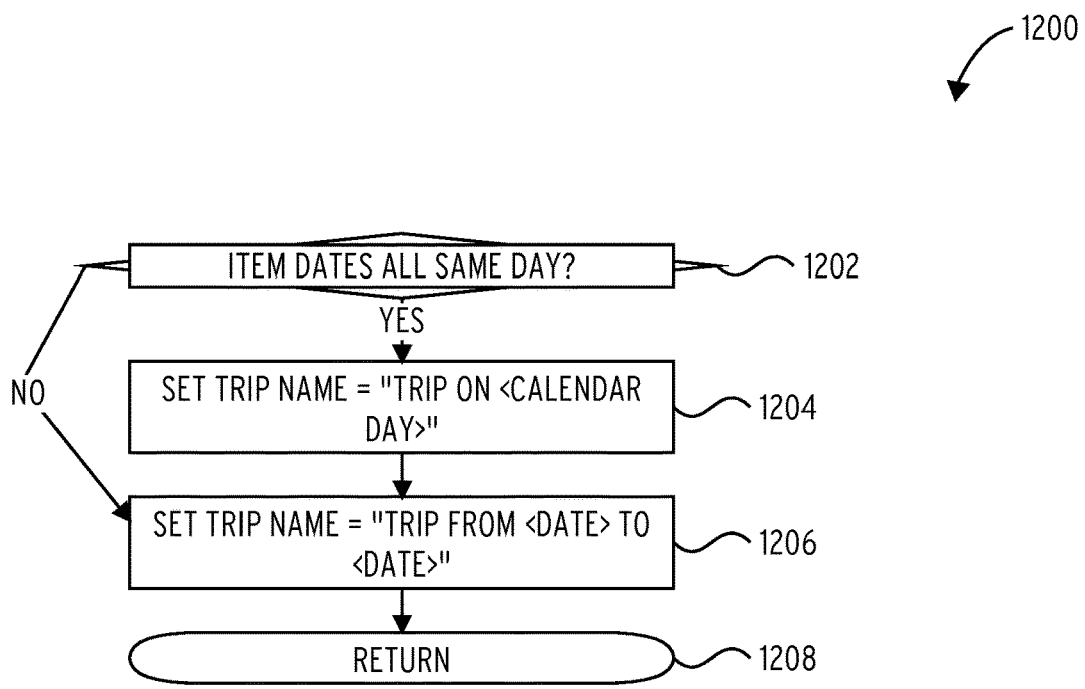
FIG. 12 is a flowchart illustrating an exemplary embodiment of All Items On Same Day Subroutine.

In relation to FIG. 12, All Items on Same Day Subroutine 1200 may be executed by, for example, User Device 200, as a subroutine of Name Trips Routine 1100 or as a stand-alone routine. All Items on Same Day Subroutine 1200 may be executed to determine a name or identifier for a Trip 322 record comprising a date or a range of dates. The determined name or identifier may be stored as, for example, a Group Name 340 record.

At decision block 1202, All Items on Same Day Subroutine 1200 may determine whether there all Item 302 records in the Trip group were recorded on the same day. If affirmative, then at block 1204 All Items on Same Day Subroutine 1200 may set Group Name 340 for the then current Trip 322 record to comprise a date including the day on which the Item 302 records in the Trip group were recorded. For example, Group Name 340 may be set to be "Trip on <calendar day>", where <calendar day> may be a date in a date format, such as "Jul. 2, 2015" or "2015-07-02".

If negative at decision block 1202, then at block 1206 All Items on Same Day Subroutine 1200 may set Group Name 340 for the then current Trip 322 record to comprise a date range, such as the range of dates across which Item 302 records in the Trip group were recorded. For example, Group Name 340 may be set to be "Trip from <first date> to <last date>", where <first date> and <last date> may be dates in a date format.

At done block 1208, All Items on Same Day Subroutine 1200 may conclude or return to a process which spawned it, such as Name Trips Routine 1100.

Figure 13:
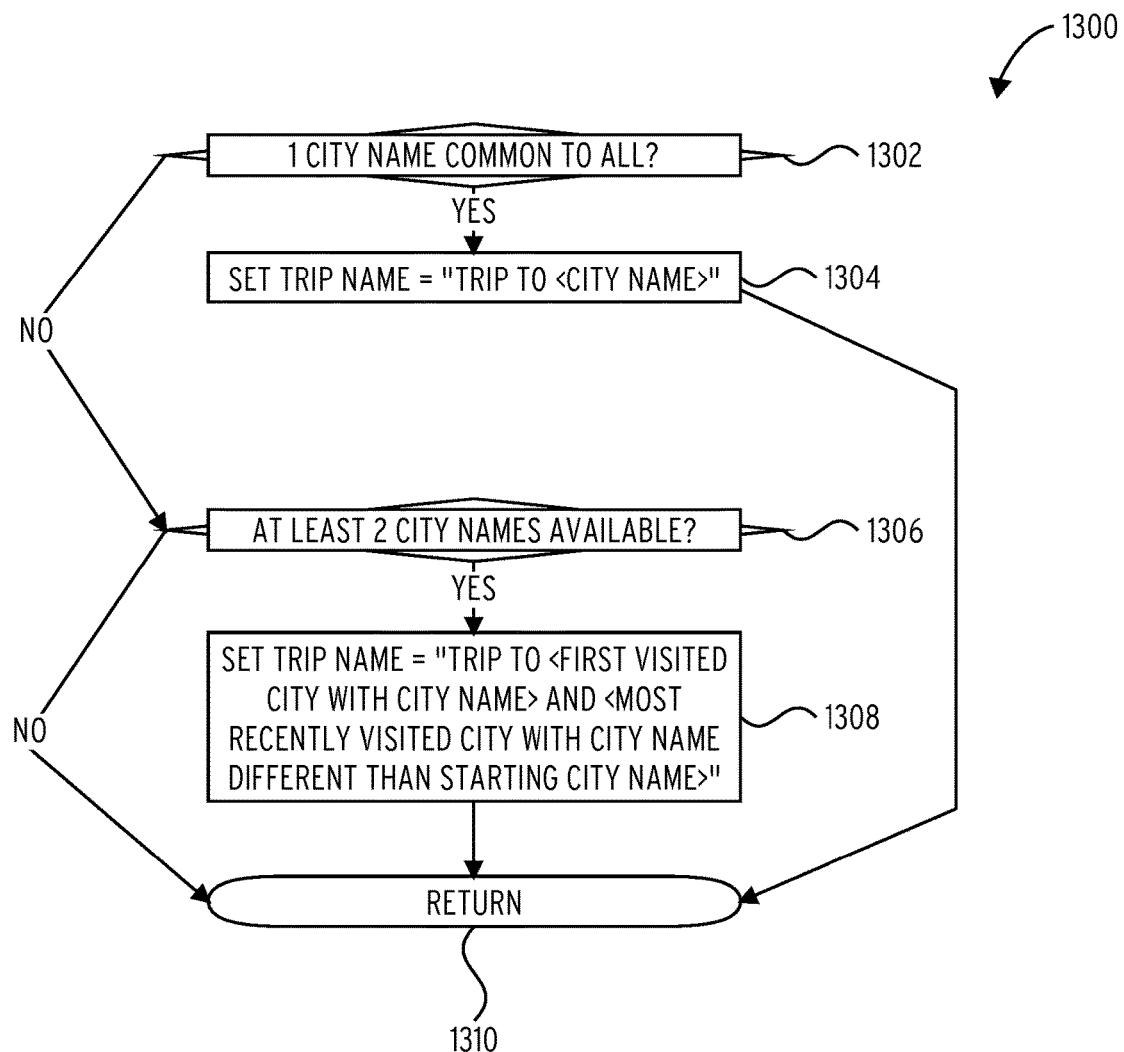
FIG. 13 is a flowchart illustrating an exemplary embodiment of City Name Subroutine.

In relation to FIG. 13, City Name Subroutine 1300 may be executed by, for example, User Device 200, as a subroutine of Name Trips Routine 1100 or as a stand-alone routine. City Name Subroutine 1300 may be executed to determine a name or identifier for a Trip 322 record comprising a City Name 308. The determined name or identifier may be stored as, for example, a Group Name 340 record.

At decision block 1302, City Name Subroutine 1300 may determine whether all Item 302 records in the Trip group comprise a common City Name 308. If affirmative, then at block 1304 City Name Subroutine 1300 may set Group Name 340 for the then current Trip 322 record to comprise the common City Name 308. For example, Group Name 340 may be set to be "Trip to <city name>", where <city name> may be a name of a city, such as "Eugene". The city name may comprise a larger region or area, such as, "Eugene, Oreg.".

If negative at decision block 1302, then at decision block 1306 City Name Subroutine 1300 may determine if Item 302 records in the then-current Trip 322 comprise at least two City Name 308 records. If affirmative, at block 1308, City Name Subroutine 1300 may set Group Name 340 record to comprise two of the at least two City Name 308 records. For example, Group Name 340 may be set to, "Trip to <first visited city with city name> and <most recently visited city with city name different than starting city name>".

At done block 1310, City Name Subroutine 1300 may conclude or return to a process which spawned it, such as Name Trips Routine 1100.

Figure 14:
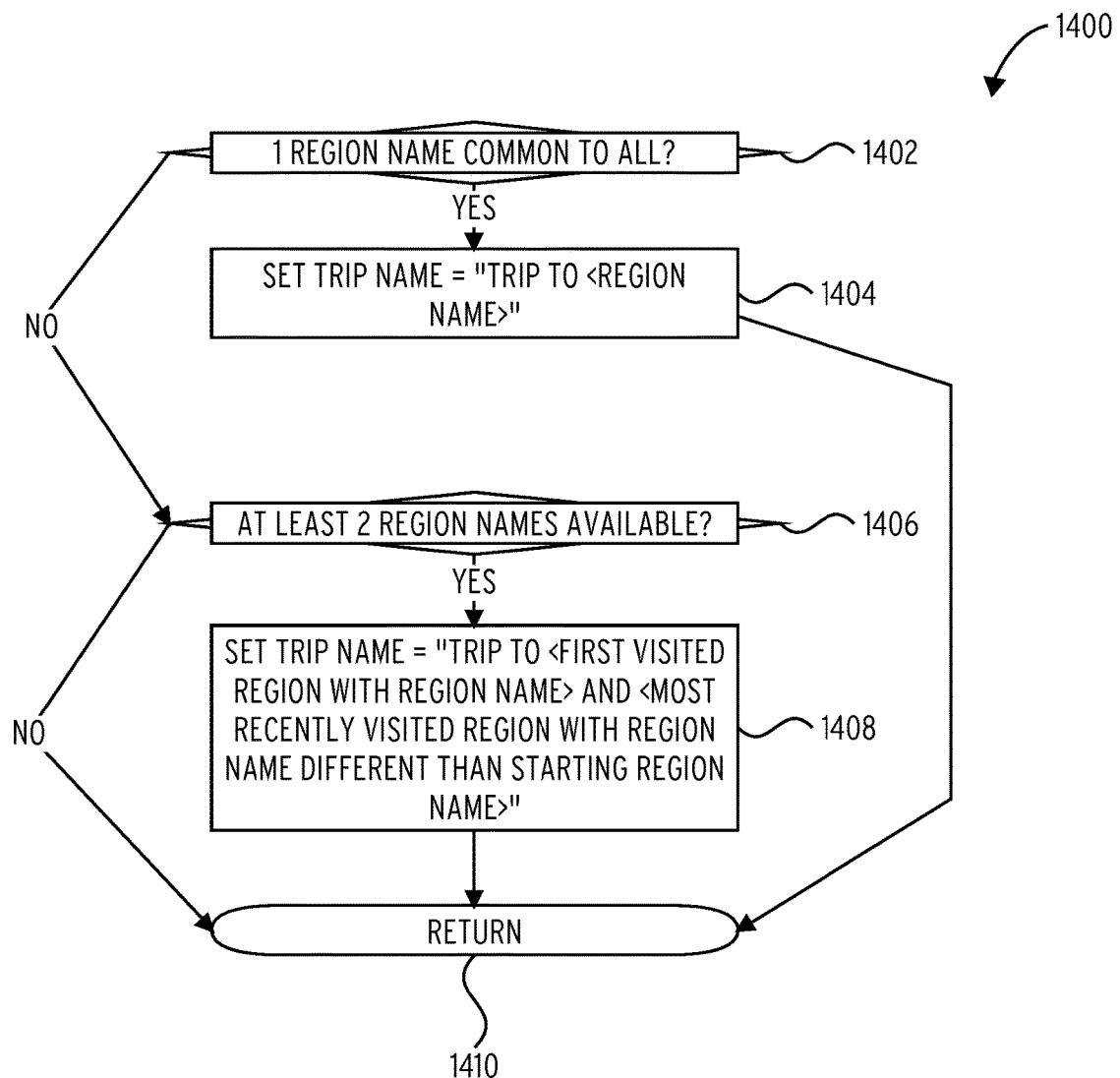
FIG. 14 is a flowchart illustrating an exemplary embodiment of Region Name Subroutine.

In relation to FIG. 14, Region Name Subroutine 1400 may be executed by, for example, User Device 200, as a subroutine of Name Trips Routine 1100 or as a stand-alone routine. Region Name Subroutine 1400 may be executed to determine a name or identifier for a Trip 322 record comprising a Region Name 310. The determined name or identifier may be stored as, for example, a Group Name 340 record.

At decision block 1402, Region Name Subroutine 1400 may determine whether all Item 302 records in the Trip group comprise a common Region Name 310. If affirmative, then at block 1404 Region Name Subroutine 1400 may set Group Name 340 for the then current Trip 322 record to comprise the common Region Name 310. For example, Group Name 340 may be set to be "Trip to <region name>", where <region name> may be a name of a region, such as "Provence". The city name may comprise a larger region or area, such as, "Provence, France".

If negative at decision block 1402, then at decision block 1406 Region Name Subroutine 1400 may determine if Item 302 records in the then-current Trip 322 comprise at least two Region Name 310 records. If affirmative, at block 1408, Region Name Subroutine 1400 may set Group Name 340 record to comprise two of the at least two Region Name 310 records. For example, Group Name 340 may be set to, "Trip to <first visited region with region name> and <most recently visited region with region name different than starting region name>".

At done block 1410, Region Name Subroutine 1400 may conclude or return to a process which spawned it, such as Name Trips Routine 1100.

Figure 15:
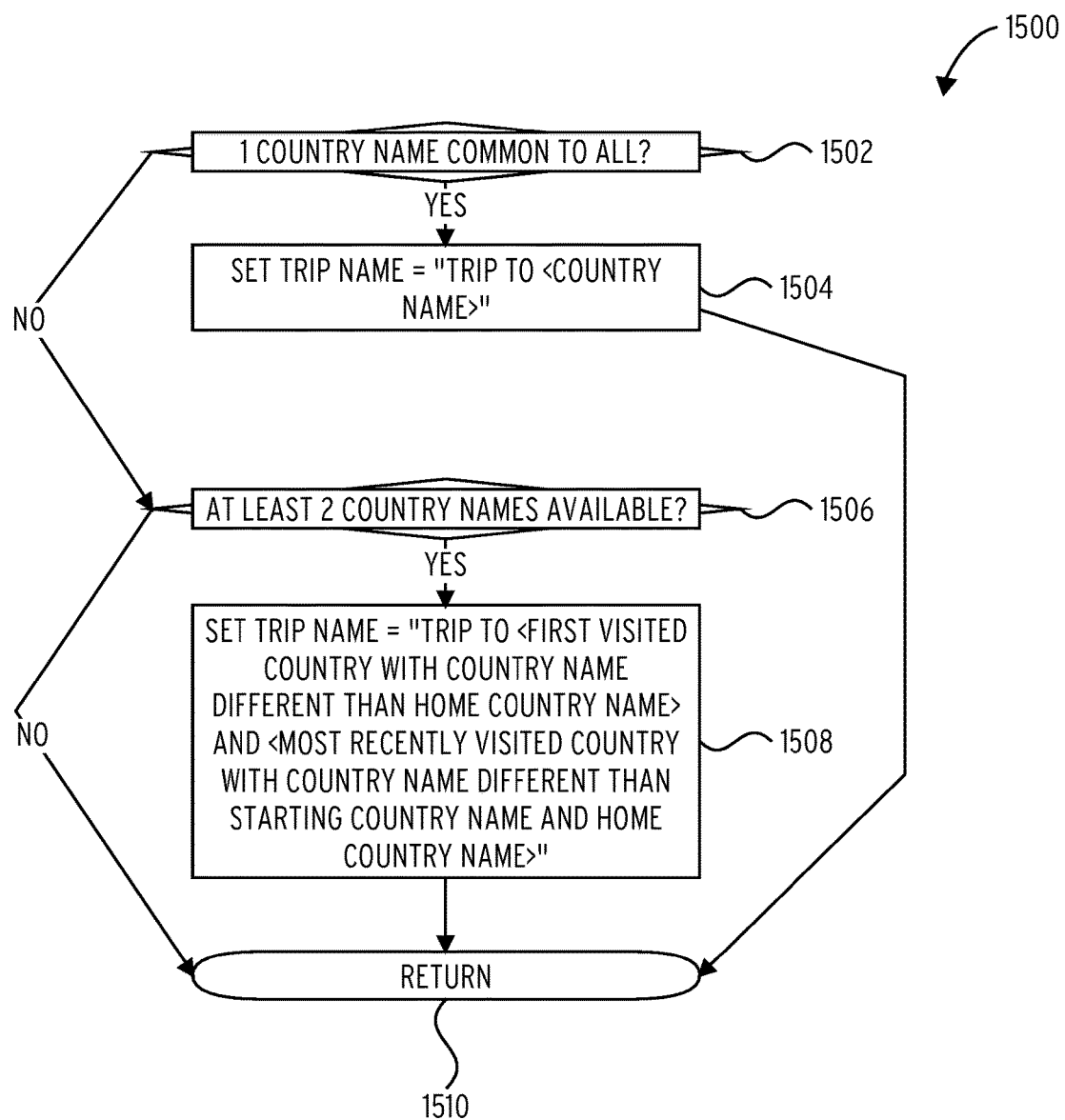
FIG. 15 is a flowchart illustrating an exemplary embodiment of Country Name Subroutine.

In relation to FIG. 15, Country Name Subroutine 1500 may be executed by, for example, User Device 200, as a subroutine of Name Trips Routine 1100 or as a stand-alone routine. Country Name Subroutine 1500 may be executed to determine a name or identifier for a Trip 322 record comprising a Country Name 312. The determined name or identifier may be stored as, for example, a Group Name 340 record.

At decision block 1502, Country Name Subroutine 1500 may determine whether all Item 302 records in the Trip group comprise a common Country Name 312. If affirmative, then at block 1504 Country Name Subroutine 1500 may set Group Name 340 for the then current Trip 322 record to comprise the common Country Name 312. For example, Group Name 340 may be set to be "Trip to <country name>", where <country name> may be a name of a country, such as "France". The city name may comprise a larger region or area, such as, "France, Europe".

If negative at decision block 1502, then at decision block 1506 Country Name Subroutine 1500 may determine if Item 302 records in the then-current Trip 322 comprise at least two Country Name 312 records. If affirmative, at block 1508, Region Name Subroutine 1400 may set Group Name 340 record to comprise two of the at least two Country Name 312 records. For example, Group Name 340 may be set to, "Trip to <first visited country with country name different than home country name> and <most recently visited country with country name different than starting country name and home country name>".

At done block 1510, Country Name Subroutine 1500 may conclude or return to a process which spawned it, such as Name Trips Routine 1100.

Figure 16:
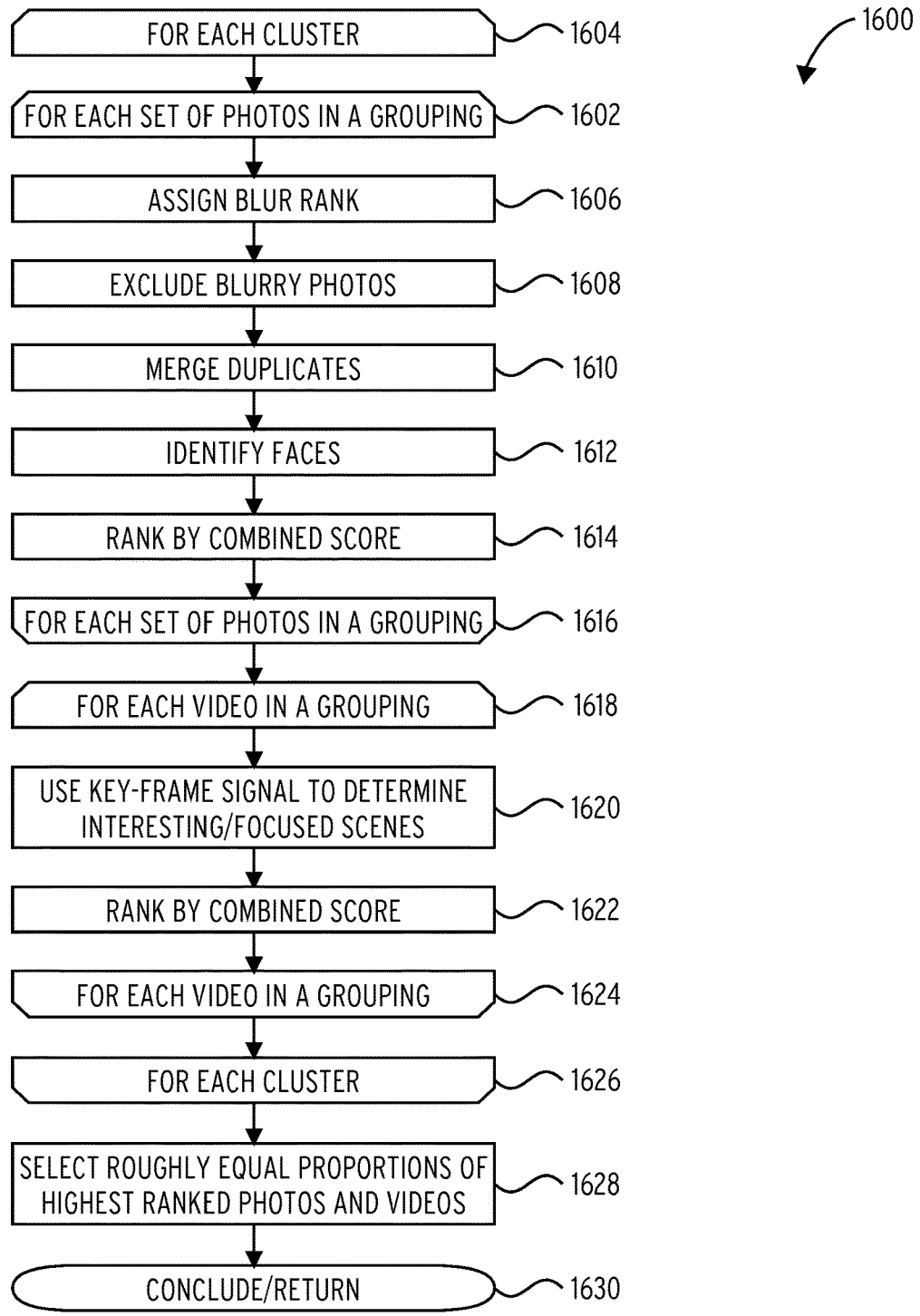
FIG. 16 is a flowchart illustrating an exemplary embodiment of Select Best Items Routine.

In relation to FIG. 16, Select Best Items Routine 1600 may be executed by, for example, User Device 200, as a stand-alone routine or as subroutine of, for example, Form and Output Clusters Routine 600. Select Best Items Routine 1600 may be executed to select the best Item 302 records in clusters created by, for example, Cluster by Event Routine 800 and Group Items and Events in Trips Routine 900.

Select Best Items Routine 1600 may select Item 302 records containing photographs which are least blurry, or which contain faces, or which contain videos which meet criteria for being interesting and of higher quality.

Opening loop block 1602 to closing loop block 1626 may iterate for each cluster. Opening loop block 1604 to closing loop block 1616 may iterate for each cluster containing an Item 302 record for a photograph. At block 1606, Select Best Items Routine 1600 may determine a blur score for photographs in the cluster, which score assigns a numeric value based on how blurry each photograph is. This score may consider, for example, to what extent the photograph contains edges.

At block 1610, Select Best Items Routine 1600 may identify and merge duplicate photographs. Identification of duplicates may be based on a bit-wise comparison and/or a subject matter comparison, such as of colors, contrast, line and line-intersection structure, and the like. Performance of this step may involve assignment of a score to the duplicates, such that only one (or less than all) of an identified duplicate group will be selected.

At block 1612, Select Best Items Routine 1600 may identify faces in the photographs and may further perform face recognition and identify names or identifiers corresponding to the faces. Performance of this step may involve assignment of a score to photographs containing faces, with additional scoring based on recurrence of one face in multiple photographs, on the amount of face or angle of a face (relative to the camera) in a photograph, for eyes being open or closed, for the presence of glasses, teeth, and the like.

At block 1614, Select Best Items Routine 1600 may rank the photographs in the cluster according to the criteria discussed above and other like criteria.

Opening loop block 1618 to closing loop block 1624 may iterate for each cluster containing an Item 302 record for a video. At block 1620 and for compressed video, Select Best Items Routine 1600 may assign a score to key-frames, which are frames which contain a fully encoded image and which do not rely on another frame to be decoded, and to non-key frames. The key-frames may be assigned a higher score.

At block 1622, Select Best Items Routine 1600 may rank the videos in the cluster based on the assigned scores.

At block 1628, Select Best Items Routine 1600 may select roughly equal proportions of the highest ranking photographs and videos.

At done block 1630, Select Best Items Routine 1600 may conclude or return to a process which spawned it.

What is claimed is:

1. A method of organizing images for display, which method is performed by a computer comprising a memory and a processor, wherein the memory comprises instructions, which, when executed by the processor, perform the following:

for a set of items associated with at least one user account, wherein items in the set of items comprise at least one photograph and at least one video:
  obtaining, by the computer, a first item and a second item for inclusion in the set of items, wherein the items are associated with item metadata comprising an item location and an item date-time, wherein the item location records a location where the item was recorded and the item date-time records a date-time when the item was recorded;
  determining a set of location cells, each location cell in the set containing at least one item from the set of items;
  recording the set of location cells in a location cell map;
  selecting a home location within the set of location cells;
  clustering at least a subset of the items in an event cluster relative to the home location;
  determining an event name for the event cluster;
  clustering entities in a trip cluster relative to the home location, wherein entities comprise an item and an event;
  determining a trip name for the trip cluster;
  selecting items from the event cluster and the trip cluster for display, including:
    for each item in the event cluster and the trip cluster which is a photograph, ranking each photograph based on at least one of a blur score assigned to each photograph and a facial score assigned to each photograph;
    for each item in the event cluster and the trip cluster which is a video, ranking each video based on a key-frame score and a non-key-frame score assigned to each video; and
    selecting equal proportions of the ranked photographs and videos for display; and
  displaying the selected items in conjunction with the event name or the trip name.

2. The method of claim 1, wherein each location cell comprises all items with item locations within a maximum location cell span and wherein determining the set of location cells comprises:
  determining whether a first item location associated with a first item will cause an existing location cell to exceed the maximum location cell span and when the first item location will not, setting the existing location cell to be the first location cell of the first item and when the first item location will cause all existing location cells to exceed the maximum location cell span, creating a new location cell for the first item.

3. The method of claim 2, further comprising excluding a subset of the existing location cells that are too remote relative to the first item location.

4. The method of claim 1, wherein selecting a home location within the set of location cells comprises determining a location cell associated with a most number of visits and selecting the center of such location cell as the home location.

5. The method of claim 4, wherein a visit is defined as creation of the item in the location cell after a chronologically preceding item creation outside of the location cell.

6. The method of claim 4, wherein when a group comprising more than one location cell have the same most number of visits, selecting within this group a location cell with the most number of items and selecting the center of such location cell as the home location.

7. The method of claim 1, further comprising determining that a first subset of entities are at a same summarized location and that a second subset of entities are possibly at the same summarized location, wherein the event may be associated with an event location.

8. The method of claim 7, further comprising determining that the first subset of entities are at the same summarized location when an item location or an event location or a place name is available for each of the entities and i) when the item location or event location for each of the entities is within a distance threshold or ii) when the place names are the same.

9. The method of claim 7, further comprising determining that the second subset of entities are possibly at the same summarized location when at least one of the entities does not have a place name and i) if at least one of the entities does not have an item location or an event location or ii) if each entity has an item location or an event location and the distance between the item or event locations is less than a distance threshold.

10. The method of claim 7, further comprising determining either i) that the first subset of entities are more than a trip-distance threshold away from the home location and forming a cluster of items recorded within a 48 hour period or ii) that the first subset of entities are less than the trip-distance threshold away from the home location and forming a cluster of items recorded within a 24 hour period.

11. The method of claim 7, further comprising forming a cluster of items in the second subset of entities recorded within a 24 hour period.

12. The method of claim 7, further comprising not displaying an event cluster if the event cluster comprises fewer than a required minimum event cluster number.

13. The method of claim 7, further comprising not displaying an event cluster if the event cluster is within a threshold distance of the home location and if the event cluster comprises fewer than a required minimum home location event cluster number.

14. The method of claim 1, wherein clustering entities in the trip cluster relative to the home location comprises determining for a new item i) that an immediately previous item was not clustered as part of a trip cluster and that an item location for the new item is greater than a trip distance threshold, starting the trip cluster, and adding such new item to the trip cluster.

15. The method of claim 14, further comprising receiving a subsequent item, relative to the new item, and ending the trip cluster if at least one of the following determinations is affirmative: i) that an item location of the subsequent item is within a threshold distance of the home location, ii) that there is no item location of the subsequent item and a trip separation time threshold has been exceeded, or iii) that the item location of the subsequent item exceeds the trip distance threshold relative to a preceding item in the trip.

16. The method of claim 15, further comprising starting a new trip cluster if the item location of the subsequent item exceeds the trip distance threshold relative to a trip location of the trip.

17. The method of claim 1, wherein determining an event name for the event cluster comprises identifying at least one item in the event cluster with a place name and setting the event name to comprise the place name.

18. The method of claim 17, further comprising identifying more than one place name for more than one item in the event cluster and setting the event name to comprise a range comprising the more than one place name, ordered from first visited to most recently visited that is different from the first visited.

19. The method of claim 1, wherein determining an event name for the event cluster comprises identifying that no items in the event cluster have a place name and setting the event name to comprise a date or a date range determined from the item date-time for items in the event cluster.

20. The method of claim 1, wherein determining a trip name for the trip cluster comprises determining that entities in the trip comprise a place name and setting the trip name to comprise the place name.

21. The method of claim 20, further comprising identifying more than one place name for more than one item in the trip cluster and setting the trip name to comprise a range comprising the more than one place name, ordered from first visited to most recently visited that is different from the first visited.

22. The method of claim 21, and when more than one place name is available, selecting the place name from the more than one place names according to which place name corresponds to the smallest geographic unit.

23. The method of claim 1, wherein determining a trip name for the trip cluster comprises identifying that no items in the trip cluster have a place name and setting the trip name to comprise a date or a date range determined from the item date-time for items in the trip cluster.

24. A non-transitory computer-readable storage medium for displaying photographs and videos, the computer-readable storage medium including instructions that when executed by a computer, cause the computer to:
for a set of items associated with at least one user account, wherein items in the set of items comprise at least one photograph and at least one video,
obtain by the computer a first item and a second item for inclusion in the set of items, wherein the items are associated with item metadata comprising an item location and an item date-time, wherein the item location records a location where the item was recorded and the item date-time records a date-time when the item was recorded or a date-time when the item was first obtained by the computer for inclusion in the set of items; determine a set of location cells, each location cell in the set containing at least one item in the set of items;
record the set of location cells in a location cell map;
select a home location within the set of location cells;
cluster the items in an event cluster relative to the home location;
cluster entities in a trip cluster relative to the home location, wherein entities comprise an item and an event;
determine an event name for the event cluster;
determine a trip name for the trip cluster;
select items from an event cluster and a trip cluster for display including:
rank each photograph in the event cluster and the trip cluster based on at least one of: how blurry each photograph is, whether each photograph is a duplicate, and whether each photograph includes a face;
rank each video in the event cluster and the trip cluster based on scores assigned to key-frames and non-key-frames of each video; and
select roughly equal proportions of a portion of the ranked photographs and videos for display; and
display the selected items in conjunction with the event name or the trip name corresponding to the event cluster or to the trip cluster.

25. A method, comprising:
storing a plurality of media items that were recorded;
clustering the plurality of media items based on a location of each of the plurality of media items when recorded relative to a home location and based on a time of each of the plurality of media items when recorded relative to one another;
for each respective photograph in the plurality of media items:
assigning a blur score to the respective photograph indicating how blurry the respective photograph is;
assigning a duplicate score to the respective photograph indicating whether the respective photograph is a duplicate of another photograph in the plurality of media items;
assigning a facial score to the respective photograph indicating whether a face is identifiable in the respective photograph and whether the face is reoccurs in other photographs in the plurality of media items; and
ranking the photographs based on the blur score, the duplicate score, and the facial score for each respective photograph;
for each respective video in the plurality of media items:

assigning a key-frame score to each key-frame of the respective video;

assigning a non-key-frame score to each non-key-frame of the respective video, the key-frame scores being higher than the non-key-frame scores; and ranking the videos based on the key-frame scores and the non-key-frame scores for each respective video; and selecting approximately equal numbers of highest ranking photographs and highest ranking videos as selected items; and displaying the selected items to a user.

* * * * *